(12) United States Patent
Tyler et al.

(10) Patent No.: US 8,571,927 B2
(45) Date of Patent: *Oct. 29, 2013

(54) METHODS AND SYSTEMS FOR RETAIL CUSTOMER REFERRAL COMPENSATION PROGRAMS

(75) Inventors: J. Benjamin Tyler, Orem, UT (US); Kenneth D. Roland, Orange Park, FL (US); Thomas Thornton, Granite Bay, CA (US); DelMar P. Williams, Highland, UT (US); Kevin F. Baadsgaard, Spanish Fork, UT (US)

(73) Assignee: Motherlode Network, American Fork, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/234,459

(22) Filed: Sep. 16, 2011

(65) Prior Publication Data
US 2012/0209675 A1 Aug. 16, 2012

Related U.S. Application Data

(63) Continuation-in-part of application No. 11/951,466, filed on Dec. 6, 2007.

(51) Int. Cl.
*G06Q 40/00* (2012.01)
(52) U.S. Cl.
USPC .................................................. 705/14.16
(58) Field of Classification Search
USPC ............................................... 705/14
See application file for complete search history.

(56) References Cited

U.S. PATENT DOCUMENTS

| 6,421,648 | B1 | 7/2002 | Gagnon et al. | |
|---|---|---|---|---|
| 7,149,707 | B2 | 12/2006 | Scoble | |
| 2004/0093269 | A1 | 5/2004 | Rubin et al. | |
| 2004/0158537 | A1 | 8/2004 | Webber et al. | |
| 2005/0222967 | A1 | 10/2005 | Adir | |
| 2007/0156445 | A1 | 7/2007 | Manuel et al. | |
| 2008/0077485 | A1* | 3/2008 | Scrudato | 705/14 |
| 2008/0320004 | A1* | 12/2008 | Jain et al. | 707/10 |

FOREIGN PATENT DOCUMENTS

| JP | 2006323799 | 11/2006 |
|---|---|---|
| KR | 20040022794 | 3/2004 |

OTHER PUBLICATIONS http://www.mlmconsultant.com/mlmlibrary_matrix_mlm.htm (website accessed Mar. 2, 2012).

* cited by examiner

*Primary Examiner* — Thomas M Hammond, III
(74) *Attorney, Agent, or Firm* — Kirton McConkie; Michael F. Krieger

(57) ABSTRACT

Embodiments of the present invention relate generally to business methods and systems for retail marketing, and specifically to retail customer referral compensation programs for using performance driven criteria to award production points for determining a referring customer's position in a performance driven floating compensation structure and matching bonus plan in a retail marketing organization.

18 Claims, 18 Drawing Sheets

501
HOW A REFERRING CUSTOMER MAY EARN PRODUCTION POINTS 12 points – For signing-up on Auto-Purchase Program.
    1 points – Each consecutive month on Auto-Purchase Program.
    5 Points – Each Personally Enrolled Enrolling Customers.
    3 Points – Each Personally Enrolled Second Level Customers.
    2 Points – Each Personally Enrolled Third Level Customer
    1 Point  – Each Personally Enrolled Fourth Level Customer
    10 Points – $25,000 Total Group Volume
    20 Points – $50,000 Total Group Volume

503
EXAMPLES OF HOW A REFERRING CUSTOMER MAY EARN PRODUCTION POINTS 12 points – For signing-up on Auto-Purchase Program.
    15 Points – 3 Personally Enrolled Enrolling Customers (5 points each)
    15 Points – 5 Personally Enrolled Second Level Customers (3 points each)
    20 Points – 10 Personally Enrolled Third Level Customers (2 points each)
    62 Points – Total Monthly Performance Points

505
EXAMPLES OF HOW A REFERRING CUSTOMER MAY EARN PRODUCTION POINTS 12 points – For signing-up on Auto-Purchase Program. (PE 1 ea. Month for 3 months)
    *3 points – 3 consecutive months on Auto-Purchase Program.*
    25 Points – 5 Personally Enrolled Enrolling Customers (5 points each)
    45 Points – 15 Personally Enrolled Second Level Customers (3 points each)
    40 Points – 20 Personally Enrolled Third Level Customers (2 points each)
    *18 Points – 18 Personally Enrolled Fourth Level Customers (1 point each)*
    20 Points – 5 Personally Enrolled Retail or Auto-Purchase Customers (4 points each)
    163 Points – Total Monthly Performance Points

507
EXAMPLES OF HOW A REFERRING CUSTOMER MAY EARN PRODUCTION POINTS 12 points – For signing-up on Auto-Purchase Program. (PE 1 ea. mo. for 8 mos.)
    8 points – 8 consecutive months on Auto-Purchase Program.
    *50 Points – 10 Personally Enrolled Enrolling Customers (5 points each)*
    150 Points – 50 Personally Enrolled Second Level Customers (3 points each)
    500 Points – 250 Personally Enrolled Third Level Customers (2 points each)
    400 Points – 400 Personally Enrolled Fourth Level Customers (1 point each)
    *10 Points – $25,000 Total Group Volume*
    1130 Points – Total Monthly Performance Points

FIG. 5A

| Customer Position in Performance-Driven Floating Matrix Before Production Points Awarded | Production Points Awarded | Customer Position in Performance-Driven Floating Matrix After Production Points Awarded |
|---|---|---|
| Customer A 1 — 511 | Customer A PTS=62 — 512 | Customer Q 1 — 515 |
| Customer B 2 | Customer B PTS=63 | Customer P 2 |
| Customer C 3 | Customer C PTS=75 | Customer O 3 |
| Customer D 4 | Customer D PTS=79 | Customer N 4 |
| Customer E 5 | Customer E PTS=83 | Customer M 5 |
| Customer F 6 | Customer F PTS=97 | Customer L 6 |
| Customer G 7 | Customer G PTS=161 | Customer K 7 |
| Customer H 8 | Customer H PTS=163 | Customer J 8 |
| Customer I 9 | Customer I PTS=183 | Customer I 9 |
| Customer J 10 | Customer J PTS=187 | Customer H 10 |
| Customer K 11 | Customer K PTS=391 | Customer G 11 |
| Customer L 12 | Customer L PTS=395 | Customer F 12 |
| Customer M 13 | Customer M PTS=499 | Customer E 13 |
| Customer N 14 | Customer N PTS=603 | Customer D 14 |
| Customer O 15 | Customer O PTS=707 | Customer C 15 |
| Customer P 16 | Customer P PTS=910 | Customer B 16 |
| Customer Q 17 — 513 | Customer Q PTS=1130 — 514 | Customer A 17 — 516 |

FIG. 5B

1201 — HOW A REFERRING CUSTOMER MAY EARN PRODUCTION POINTS 12 points – For signing-up on Auto-Purchase Program.
    1 points – Each consecutive month on Auto-Purchase Program.
    5 Points – Each Personally Enrolled Enrolling Customers.
    4 Points – Each Personally Enrolled Second Level Customers.
    3 Points – Each Personally Enrolled Third Level Customer
    2 Point – Each Personally Enrolled Fourth Level Customer
    1 Point – Each Personally Enrolled Mth Level Customer
    10 Points – $25,000 Total Group Volume
    20 Points – $50,000 Total Group Volume

1203 — EXAMPLES OF HOW A REFERRING CUSTOMER MAY EARN PRODUCTION POINTS 12 points – For signing-up on Auto-Purchase Program.
    15 Points – 3 Personally Enrolled Enrolling Customers (5 points each)
    4 Points – 1 Personally Enrolled Second Level Customers ( 4points each)
    3 Points – 1 Personally Enrolled Third Level Customers ( 3points each)
    2 Points – 1 Personally Enrolled Mth Level Customer (2 points each)
    5 Points – 5 Personally Enrolled Mth Level Customer (1 points each)
    41 Points – Total Monthly Performance Points

1205 — EXAMPLES OF HOW A REFERRING CUSTOMER MAY EARN PRODUCTION POINTS 12 points – For signing-up on Auto-Purchase Program. (PE 1 ea. Month for 3 months)
    3 points – 3 consecutive months on Auto-Purchase Program.
    25 Points – 5 Personally Enrolled Enrolling Customers (5 points each)
    4 Points – 1 Personally Enrolled Second Level Customers (4 points each)
    3 Points – 1 Personally Enrolled Third Level Customers (3 points each)
    2 Points – 1 Personally Enrolled Fourth Level Customers (2 point each)
    45 Points – 45 Personally Enrolled Mth Level Customer (1 point each)
    20 Points – 5 Personally Enrolled Retail or Auto-Purchase Customers (4 points each)
    114 Points – Total Monthly Performance Points

1207 — EXAMPLES OF HOW A REFERRING CUSTOMER MAY EARN PRODUCTION POINTS 12 points – For signing-up on Auto-Purchase Program. (PE 1 ea. mo. for 8 mos.)
    8 points – 8 consecutive months on Auto-Purchase Program.
    50 Points – 10 Personally Enrolled Enrolling Customers (5 points each)
    4 Points – 1 Personally Enrolled Second Level Customers (4 points each)
    3 Points – 1 Personally Enrolled Third Level Customers (3 points each)
    2 Points – 1 Personally Enrolled Fourth Level Customers (2 point each)
    700 Points – 700 Personally Enrolled Mth Level Customers (1 point each)
    10 Points – $25,000 Total Group Volume
    789 Points – Total Monthly Performance Points

FIG. 12

METHODS AND SYSTEMS FOR RETAIL CUSTOMER REFERRAL COMPENSATION PROGRAMS

CROSS-REFERENCE TO RELATED APPLICATIONS

This application is a continuation-in-part of prior application Ser. No. 11/951,466, filed Dec. 6, 2007, which is herein incorporated by reference in its entirety.

FIELD OF THE INVENTION

The present invention relates generally to business methods and systems for network and retail marketing, and specifically to retail customer referral programs for using production based criteria to award points for determining a retail customer's position in a performance driven floating structural compensation plan in a network and retail marketing organization.

The performance driven floating structural compensation plan could be applied to existing base compensation plans of all types. Some non-limiting examples may include breakaway, uni-level, stairstep or step-level, binary, matrix, or hybrid compensation plans. Alternatively, the performance driven floating structural compensation plan could be applied to other existing plans or it could be used as a plan itself having similar or different structural features.

BACKGROUND OF THE INVENTION

Network marketing, also known as multi-level marketing or MLM, is a business model that combines direct retail marketing with a salesforce of independent contractors. Network marketing is an alternate channel for a manufacturer or retailer to advertise, sell and deliver its products to market. Other channels may include retail storefronts, catalog shopping, and door-to-door sales.

Network marketing businesses usually function by enrolling unsalaried salespeople, also known in the business as "Independent Distributors," "Independent Business Owners," "Sales Consultants," etc., (hereinafter "Independent Distributor") to sell products and earn additional sales commissions based on the sales of people recruited into their downline. A downline may include direct recruits, recruits' recruits and so on such that there may be multiple levels of people receiving commissions from one person's sales.

Network marketing offers several advantages over the other retail channels such as low advertising overhead. Unlike a typical retail company, the network marketing company doesn't have to spend large amounts of money to obtain customers. Instead, it pays Independent Distributors to expose and promote the product out into the marketplace. In addition, the company only has to pay the Independent Distributor a percentage commission on products actually sold.

In a traditional network marketing organization, Independent Distributors are rewarded for the sales they create, not only directly, but indirectly as well. Independent Distributors earn profit from any retail sales they make, plus they also may earn a bonus or override on the sales made by people they recruited into the company, and the people they recruited, and the people they recruited, etc. By getting a small percentage from many people, an Independent Distributor's income can grow to a very large number.

Over the years, companies have developed a variety of network marketing compensation plans. Some of these may include breakaway, uni-level, stairstep or step-level, binary, matrix, or hybrid plans. Matrix plans may have a variety of different structures including 1 by M (single leg), 2 by M, 3 by M, and so forth up to and including matrices having infinite width and/or depth. Such a matrix may be identified as an N by M (or N×M) matrix where N represents the number of columns or legs in the matrix and M represents the number of rows or levels in the matrix. Other interrelated compensation plans may also result from breakaways. Some compensation plans may be hybrids including a combination of various features found in other discrete plans.

By way of example, the traditional "uni-level" plan is often considered the simplest of compensation plans. As the name suggests, the plan allows an Independent Distributor to sponsor one line of people, called a "frontline." Every person the Independent Distributor sponsors is considered to be on that Independent Distributor's frontline and there are no width limitations, meaning there is no limit to the amount of people one can sponsor on his or her frontline. The common goal of this plan is to recruit a large number of frontline persons and then encourage them to do the same. This is due to the fact that commissions are normally paid out on a limited depth. For example, if a company uses a uni-level plan allowing commissions on sales 5 levels deep, the Independent Distributor can have an unlimited number of people on their frontline, but can be paid no more than 5 levels deep. Typically, an Independent Distributor must qualify to earn commissions on downline recruits.

In a further example, the traditional "matrix" is similar to a uni-level plan, except that there is a limited number of persons who can be placed on the first level. Accordingly, matrix plans typically have a structure that has a fixed "shape" that determines the size of the organization, or personal enroller genealogy, the Independent Distributor can be paid on. For example, if a company uses a 4×4 matrix, the Independent Distributor can have no more than 4 people on their frontline, and can be paid no more than 4 levels deep. If they already have 4 people on their frontline, any future people they enroll will have to be "placed" somewhere below those 4 frontline people in other open spots below them in the matrix. This is called "spillover." Matrix plans often have a maximum width and depth. When all positions in an Independent Distributor's downline matrix are filled (maximum width and depth is reached for all participants in a matrix), a new matrix may be started. Like uni-level plans, Independent Distributors in a matrix may earn unlimited commissions on limited levels of volume after qualifying to do so.

As mentioned above, matrix plans limit the width of each level in an Independent Distributor's group, forcing successful recruiters to position their recruits under other people who did not recruit them ("spillover"). Spillover, therefore, can be viewed as either a curse or a blessing, with proponents saying it's a great way to cause people to help their downlines since recruits will automatically be placed below their downline distributors. Spillover also tends to keep people active, because they don't want to lose out on the recruits spilling over from their upline. Others argue that spillover rewards weak and non-performing Independent Distributors, because if an Independent Distributor is producing, they will already have people below them, causing new recruits to likely be placed in the "holes" under non-producers.

As mentioned above, traditional matrix plans may have a variety of different structures including 1 by M (single leg), 2 by M, 3 by M, and so forth up to and including matrices having infinite width and/or depth. The traditional "single leg" is a type of matrix plan with a structure that has a one-dimensional fixed "shape" that determines the group genealogy the Independent Distributor can be paid on. Specifically, in a single leg matrix, the number of persons who can be placed on the first level or frontline is exactly 1. Again, however, commissions are normally paid out on a limited depth. For example, if a company uses a 1×6 single leg matrix plan allowing commissions on sales 6 levels deep, the Independent Distributor can have no more than 1 person on their frontline, and can be paid no more than 6 levels deep. If they already have 1 person on their frontline, any future people they enroll will spillover to somewhere below that frontline person. Similarly, any future people enrolled by someone above the Independent Distributor will also spillover to somewhere below the Independent Distributor's frontline person.

As discussed above, single leg matrix plans limit the width of each level in an Independent Distributor's group to a single downline or leg, forcing every recruiter to position their recruits under other people who did not recruit them. As discussed above, such spillover can be viewed as either a curse or a blessing.

Other examples of network marketing compensation plans may include "binary" plans. A traditional binary plan is a multilevel marketing compensation plan which allows Independent Distributors to have only two frontline people. If an Independent Distributor sponsors more than two people, the additional people spillover. One advantage to binary plans is that new Independent Distributors generally need only sponsor two people to participate in the compensation plan. The primary limitation is that distributors must "balance" their two downline legs to receive commissions. Balancing legs typically requires that the number of sales from one downline leg constitute no more than a specified percentage of the Independent Distributor's total sales.

Another example of network marketing compensation plans may include "stairstep" or "step-level" plans. This type of plan is characterized as having Independent Distributors who are responsible for both personal and group sales volumes. Volume is created by recruiting and by retailing product. Various discounts or rebates may be paid to group leaders and a group leader may be any Independent Distributor with one or more downline recruits. Once predefined personal and/or "group volumes" are achieved, an Independent Distributor moves up a commission level. This continues until the Independent Distributor's sales volume reaches the top commission level and "breaks away" from their upline. From that point on, the Independent Distributor's group volume is no longer included in their sponsor's group volume. Breakaways are generally entitled to additional compensation, which is usually referred to as an "override." Breakaway concepts can also be part of any or all of the network marketing compensation plans previously discussed.

In each of the traditional network marketing compensation plans discussed above, an Independent Distributor remains permanently in the original position into which they were recruited. In addition, in each of the traditional plans "breakage" may occur when unpaid commissions are retained by the company. Breakage may result when an Independent Distributor is either unqualified or ineligible to receive commissions, at or close to the top of the company genealogy, or is an "orphan" (an Independent Distributor who is not properly linked to the network structure).

The network marketing plans previously discussed typically have some provisions for paying commissions and incomes on the volume of sales made during a certain time period. There is typically a minimum group volume requirement for an Independent Distributor to qualify for these commissions. The number of levels of volume in the compensation plan the Independent Distributor is paid on and the percentages they receive are dependent on the company and the position they have reached. In a conventional matrix marketing plan the sales volume made by an Independent Distributor only benefits their direct personal and/or placement upline. In a conventional single leg matrix the sales volume made by an Independent Distributor typically benefits the entire placement upline.

Thus, while techniques currently exist that are used for implementing and managing retail customer referral compensation programs, challenges still exist. Accordingly, it would be an improvement in the art to augment or even replace current techniques with other techniques.

SUMMARY OF THE INVENTION

The present invention relates generally to business methods and systems for network and retail marketing, and specifically to retail customer referral programs for using production based criteria to award production points for determining a retail customer's position in a performance driven floating structural compensation plan in a network and retail marketing organization.

The performance driven floating structural compensation plan could be applied to existing base compensation plans of all types. Some non-limiting examples may include breakaway, uni-level, staristep or step-level, binary, matrix, or hybrid compensation plans. Alternatively, the performance driven floating structural compensation plan could be applied to other existing plans or it could be used as a plan itself having similar or different structural features.

Implementation of the present invention takes place in association with retail customer referral compensation programs. In at least one implementation, a method for promoting customer loyalty and reducing attrition is provided. In such implementations, the retail customer referral compensation program may comprise a performance driven floating structural compensation plan which allows Independent Distributors, referring customers, auto-purchase customers and other customers in a retail marketing network to move or "float" within the structural hierarchy. Changing positions within the structural hierarchy takes place at the end of predetermined compensation periods, based upon production points awarded for performance in certain criteria areas. The periodic movement and repositioning of retail marketing participants allows them to qualify for commissions and bonuses that they may not otherwise qualify for were they to remain permanently in the original position into which they were recruited. Further, the performance driven floating structural compensation plan reduces or eliminates breakage.

In some implementations, retail marketing participant performance criteria may include, but are not limited to, areas such as training, sales, enrollment that leads to increased sales and the like. In such implementations, production points may be awarded for personally enrolling auto-purchase customers. An auto-purchase customer may be a preferred retail customer who agrees to purchase product at a special reduced price for having the product automatically shipped to them on a regular pre-scheduled basis, such as once a month. An auto-purchase customer does not participate in the referral program's compensation plan. In a further implementation, production points may also be awarded for becoming a referring customer. A referring customer may be a customer who purchases product in a manner similar to an auto-purchase customer but they have also furnished a Social Security number or tax ID so they are entitled to qualify for commissions and bonuses in the referral program's compensation plan.

In further implementations of the present invention, 12 points may be awarded for becoming a referring customer.

One point may then be deducted for each month the referring customer does not enroll a new auto-purchase customer or referring customer. One point may also be awarded for each consecutive month of membership as an auto-purchase customer.

In yet another implementation, points may also be awarded to promote an emphasis toward teamwork for enrolling retail customers. For example, in some implementations, 5 points may be awarded for each referring customer personally enrolled. 3 points may be awarded for each $2^{nd}$ generation enrollee as a referring customer, 2 points for each $3^{rd}$ generation enrollee as referring customer and 1 point for each $4^{th}$ generation enrollee as referring customer. Alterative point levels may also be awarded for similar or different performance criteria. For example, in some implementations, a performance driven floating structural plan may be a single leg matrix plan. In such implementations, 1 point may be awarded for each $M^{th}$ generation enrollee as referring customer where M represents either a fixed or an unlimited number of generational levels in a performance driven floating single leg matrix.

In some implementations, additional points may be added to continue the emphasis on individually enrolling referring customers, which benefits everyone in the compensation plan because these customers add volume but do not participate in the compensation plan. For example, in some implementations, 4 points may be awarded for each personally enrolled retail customer or auto-purchase customer.

points may also be awarded for team building accomplishments such as 10 points for personal group volume of $25,000 or 20 points for personal group volume of $50,000. points may also be awarded to give flexibility for a company to promote attendance at various training functions such as 1 point for completing each segment of a training program.

Some implementations of the present invention also comprise global matching bonus pools, which may be shared at the end of a compensation period with qualified referring customers based upon their personal genealogy downline and production in the performance driven floating structural compensation plan. The bonus pools may be made up from the total wholesale product volume sold each period through the retail auto-purchase customer referral compensation program. Some implementations may comprise an enroller matching bonus in addition to the global matching bonus pools. The enroller matching bonus may be given to referring customers who are personal enrollers and who qualify by having a corresponding number of personally enrolled referring customers. In some implementations, if a personal enroller does not qualify, the matching bonus rolls up to the first qualified personal enroller in the upline of the non-qualifying referring customer.

The present invention is an improved retail customer referral compensation program over the prior art. The performance driven floating structural compensation plan and matching bonus pools of the present invention promote customer loyalty, team building and reduce attrition, while overcoming many of the problems associated with traditional network marketing compensation plans.

Additional objects and advantages of the invention will be set forth in the description which follows, and in part will be obvious from the description, or may be readily learned by the practice of the invention. The objects and advantages of the invention may be realized and obtained by means of the instruments and combinations particularly pointed out in the description. These and other objects and features of the present invention will become more fully apparent from the following description, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5A illustrates an exemplary table of retail customer referral compensation program personal genealogy downline points;

FIG. 5B illustrates an exemplary periodic repositioning of referring customers in a performance driven floating structural compensation plan from application of customer awarded production points;

FIG. 12 illustrates another table of retail customer referral compensation program personal genealogy downline points for use in a floating single leg matrix;

DETAILED DESCRIPTION OF THE INVENTION

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention, described with reference to FIG. 1, may comprise initially generating or creating 100 a floating compensation structure based on commissionable volume. In some embodiments, the number of positions in the floating compensation structure may be based on a multiple of the number of products sold during the previous compensation period. In such embodiments, each of the products sold may be assigned a specified unit value. At the end of a compensation period, the total number of commissionable value units may represent the number of positions within the floating structure. In some embodiments, a performance driven floating structural compensation plan may be a matrix plan. In other embodiments, any suitable floating structure is contemplated including, for example, breakaway, uni-level, staristep or step-level, binary, single leg matrix, or hybrid compensation plans and so forth.

Figure 1:
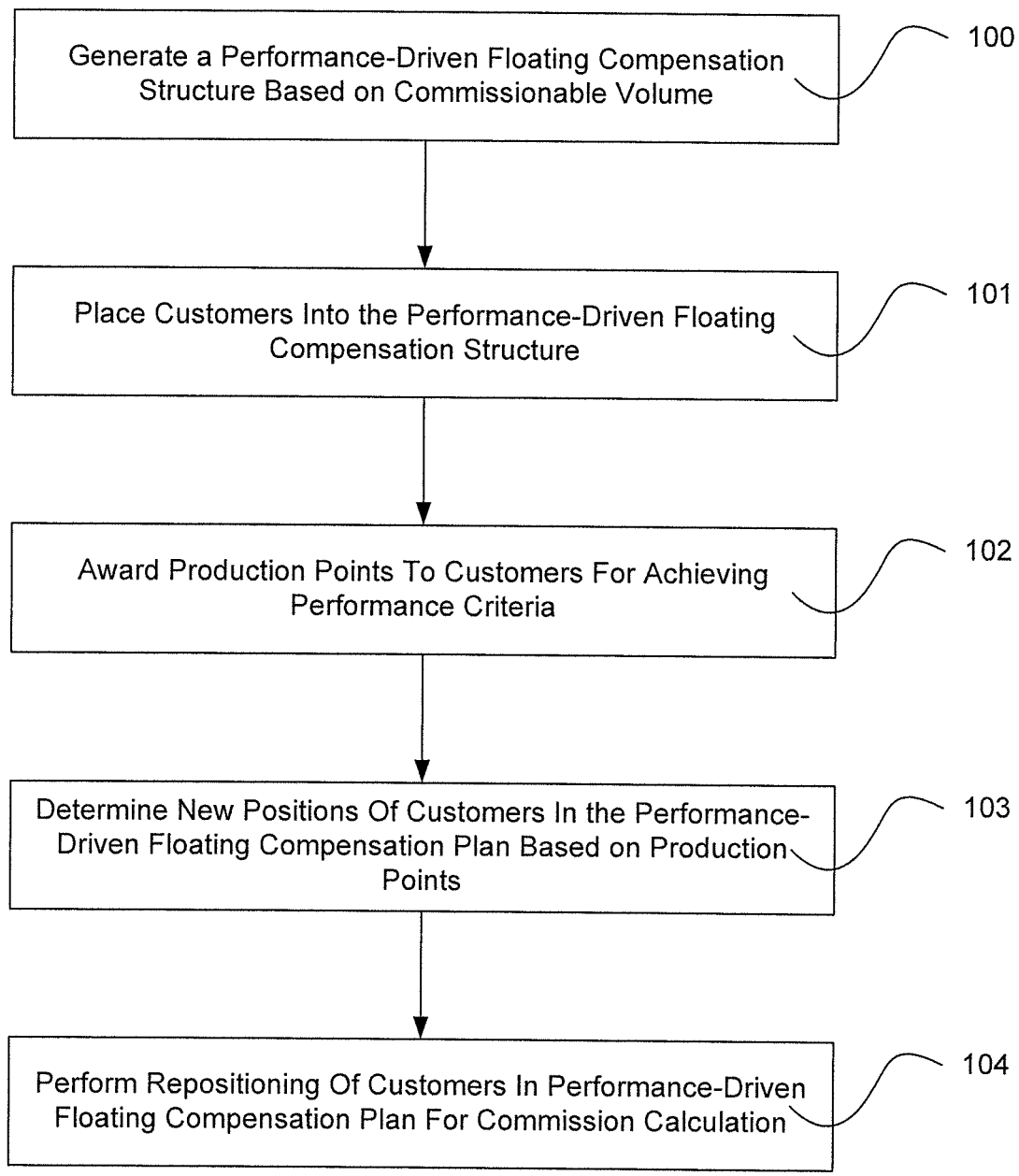
FIG. 1 illustrates a flowchart of a method for awarding production points to customers to determine periodic repositioning in a performance driven floating structural compensation plan.

With continued reference to FIG. 1, customers may then be placed 101 into the performance driven floating structural compensation plan with customers placed according to their production points earned that commission period. Performance points may then be awarded 102 to these customers for achieving specified performance criteria. referring customer performance may be measured over a period of time, such as a month, for a variety of performance criteria such as sales, training, and enrolling which leads to increased sales. Once the production points have been awarded, new positions may then be determined 103 for the customers in the performance driven floating structural compensation plan based upon the number of production points awarded to each customer. When the new positions have been determined, customers may then be repositioned 104 to a new position in the performance driven floating structural compensation plan for calculation of commissions.

Figure 2:
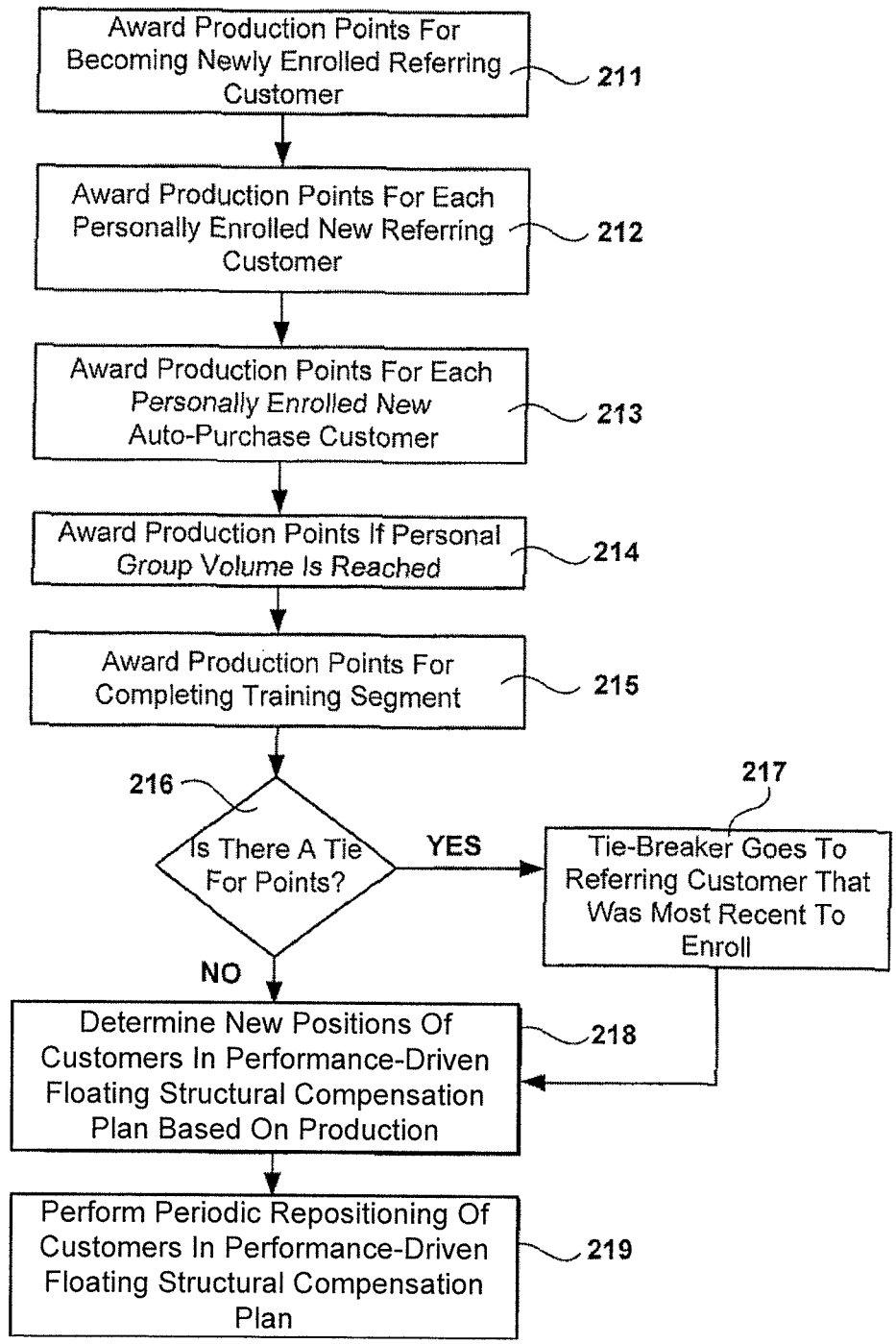
FIG. 2 illustrates a flowchart of a method for awarding achievement-based production points to determine periodic repositioning of referring customers in a performance driven floating structural compensation plan.

In some embodiments, described with reference to FIG. 2, production points may be awarded 211 for becoming a newly enrolled referring customer. These points may be awarded to jump start newly enrolled referring customers and encourage them to add additional customers. This may also promote consistency in enrollment as well as continuous retail consumption. In some embodiments, 12 points may be awarded for becoming a referring customer. 1 point may then be deducted each month a customer does not enroll a new auto-purchase customer or referring customer. 1 point may also be awarded for each consecutive month as an auto-purchase customer. These deductions may have limits. For example, new referring customers may be given 12 jumpstart points that will be reduced by one point for each month they do not enroll another active customer into the program. The participant may never lose more than the original 12 points over any period of time. If a referring customer enrolls one or more customers in any month, the referring customer will keep their remaining jumpstart points. If a referring customer does not enroll any customers in a month, they will lose one of the original jumpstart points. This process will continue until all 12 jumpstart points have been lost thereby giving new enrollees another opportunity to move up in the marketing plan ahead of those that don't perform.

Production points may also be awarded 212 for each personally enrolled new referring customer. These points continue the emphasis on teamwork for enrolling new retail customers. For example, in some matrix embodiments, 5 points may be awarded for each personally enrolled referring customer. 3 points may also be awarded for each $2^{nd}$ generation enrollee as referring customer, 2 points for each $3^{rd}$ generation enrollee as referring customer and 1 point for each $4^{th}$ generation enrollee as referring customer. Alternatively, in some single leg matrix embodiments, 5 points may be awarded for each personally enrolled referring customer. 4 points may also be awarded for each $2^{nd}$ generation enrollee as referring customer, 3 points for each $3^{rd}$ generation enrollee as referring customer, 2 points for each $4^{th}$ generation enrollee as referring customer, and 1 point for each $M^{th}$ generation enrollee as referring customer where M represents either a fixed or an unlimited number of generational levels in a performance driven floating structural compensation plan.

In some embodiments, production points may also be awarded 213 for each personally enrolled new auto-purchase customer. These points continue the emphasis on individually enrolling retail customers. This benefits everyone in the program because auto-purchase customers add volume but do not participate in the compensation plan. In some embodiments, 4 points may be awarded for each personally enrolled retail or auto-purchase customer.

In some embodiments, production points may also be awarded 214 for reaching a personal group volume. For example, in a 4×4 performance driven floating matrix, the group of a referring customer may include her entire four-level matrix. Alternatively, in a performance driven floating single leg matrix, the group of a referring customer may include the entire single leg or a specified portion of the single leg. These points reward team-building accomplishments. In one embodiment, 10 points may be awarded for reaching a personal group volume of $25,000. 20 production points may be awarded for reaching a personal group volume of $50,000. Even more points may be awarded for reaching even higher group volumes.

In some embodiments of the present invention, production points may also be awarded 215 for completing a segment of a training program. These points give flexibility for a company to promote attendance at various training functions. In some embodiments, one point may be awarded for completing each segment of a training program.

At the end of each compensation period, just prior to the commission run, all the production points awarded may be added up to determine 218 the new positions of all customers on the performance driven floating structural compensation plan. By doing this, even new referring customers may, by virtue of personal performance, move up in the floating structure ahead of those that did not perform as well or got in earlier in the same month or even earlier. In some embodiments, in the case of a tie for points 216, a tiebreaker 217 may go to the referring customer who was most recent to enroll. Once the new positions on the floating structure have been determined 218, a periodic repositioning 219 of referring customers in the floating structure may be performed.

Figure 3A:
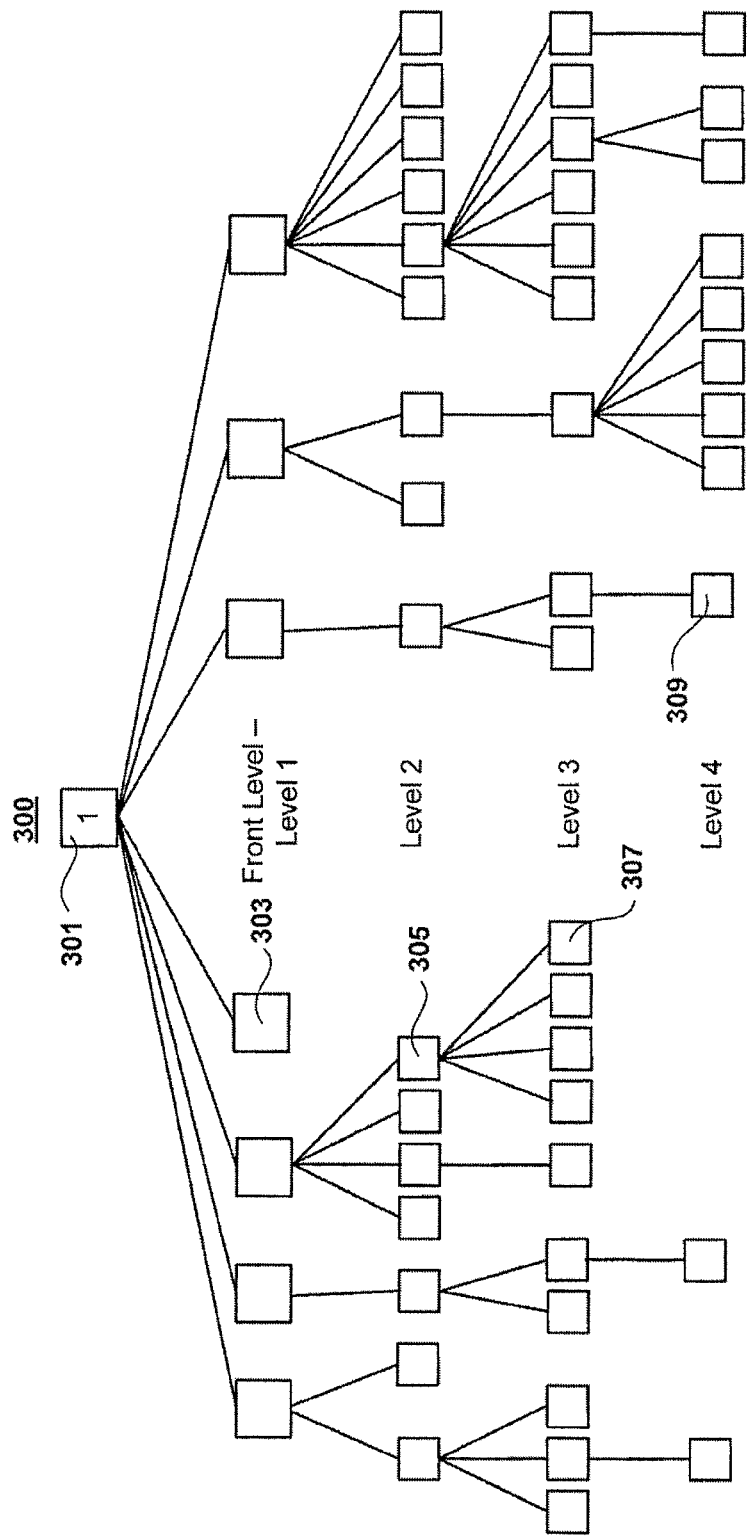
FIG. 3A illustrates a retail customer referral compensation program personally enrolled downline (personal genealogy) used for qualification purposes.

Some embodiments of the present invention may comprise two referring customer downlines for each referring customer. Some embodiments of the present invention, described with reference to FIG. 3A, may comprise a personally enrolled downline 300 or genealogy, which may resemble a traditional multi-level marketing matrix hierarchy. The personally enrolled downline 300 may be used for "qualifications" in the retail customer referral compensation program and may comprise a first referring customer or customer 1 301, with a frontline or level 1 303 of customers placed under them. These may be retail customers, auto-purchase customers and other referring customers that are personally referred by referring customer 1 301.

In some embodiments, there may be no width limits in the personally enrolled downline 300 and a referring customer may have an unlimited number of customers in their personally enrolled downline 300 and referring customer 1's 301 front level or level 1 303 may have an unlimited number of retail customers, auto-purchase customers and referring customers that were personally referred by referring customer 1 301. In some embodiments the second level or level 2 305 may also comprise an unlimited number of additional retail customers, auto-purchase customers and referring customers that were personally referred by referring customer 1's 301 front level or level 1 303. In some embodiments the third level or level 3 307 and fourth level or level 4 309 may also comprise an unlimited number of additional retail customers, auto-purchase customers and referring customers that were personally referred by referring customers in the level above them. The personally enrolled downline 300 may continue down with additional levels and may be as deep as needed to place all of the customers in the referring customer's genealogy or personally enrolled downline.

Other embodiments of the present invention may comprise a second, performance based, referring customer downline for each referring customer. These embodiments, described with reference to FIG. 3B, may comprise a performance driven floating structural compensation plan 310, which may also resemble a traditional multi-level marketing matrix hierarchy. In some embodiments, production points may be awarded for achieving performance based criteria and totaled each compensation period for each referring customer in the downline. Each referring customer may then be assigned a numbered position from highest to lowest depending on the total points earned in the program that compensation period.

Figure 3B:
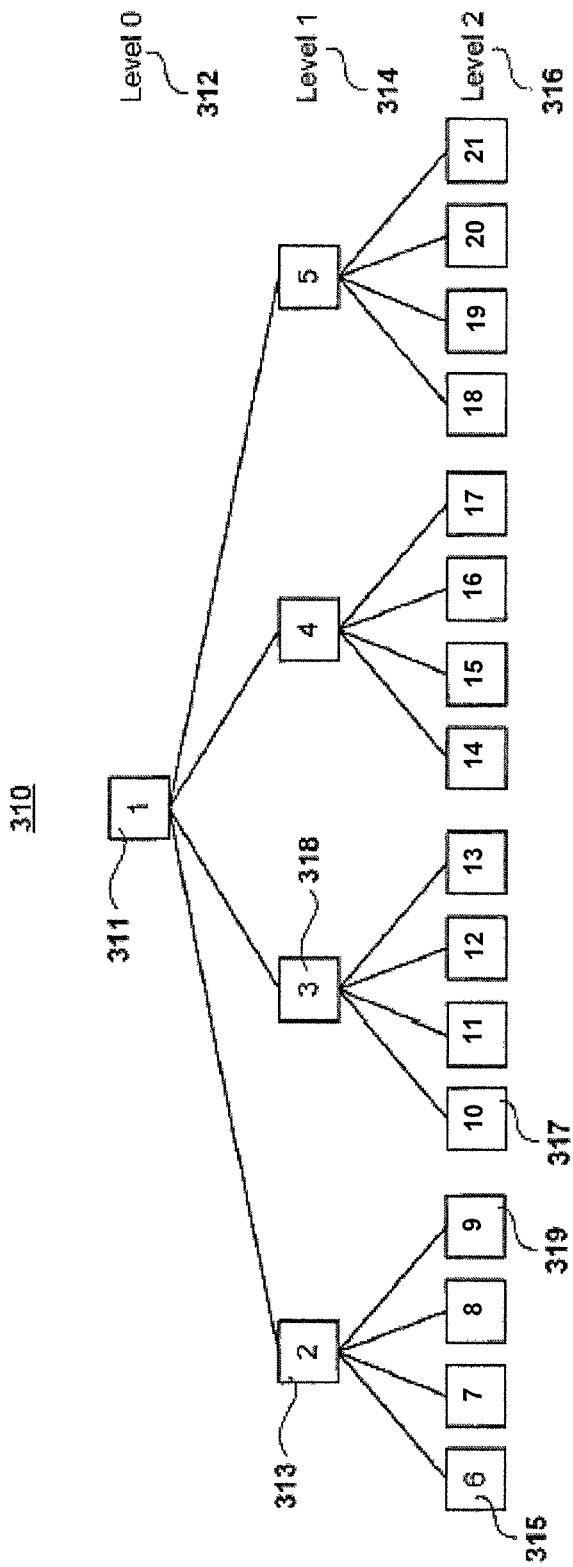
FIG. 3B illustrates a 1×4 to infinity performance driven floating structural compensation plan periodic repositioning based on total points.

With continued reference to FIG. 3B, one embodiment of a performance driven floating structural compensation plan 310, with 3 levels and 21 customers, may comprise a first referring customer or customer 1 311 on level 0 312, with the most production points earned for that compensation period, and a level 1 314 placed under customer 1 311 comprising a referring customer with less production points for that compensation period placed in order of the amount of production points earned, from left to right, with customer 2 313 having the second most amount of production points. level 2 316, may comprise 16 additional referring customers placed under the referring customers in level 1 314 with 4 referring customers placed under each level 1 referring customer in order of the amount of production points earned during the compensation period. The referring customers on level 2 316 may be placed in consecutive order from left to with customer 6 315 to customer 9 319 placed under customer 2 313 and customer 10 317, placed under customer 3 318 and so forth continuing on down to the referring customer with the least amount of production points for the compensation period, customer 21 319, being placed in the final spot under customer 5.

Figure 4A:
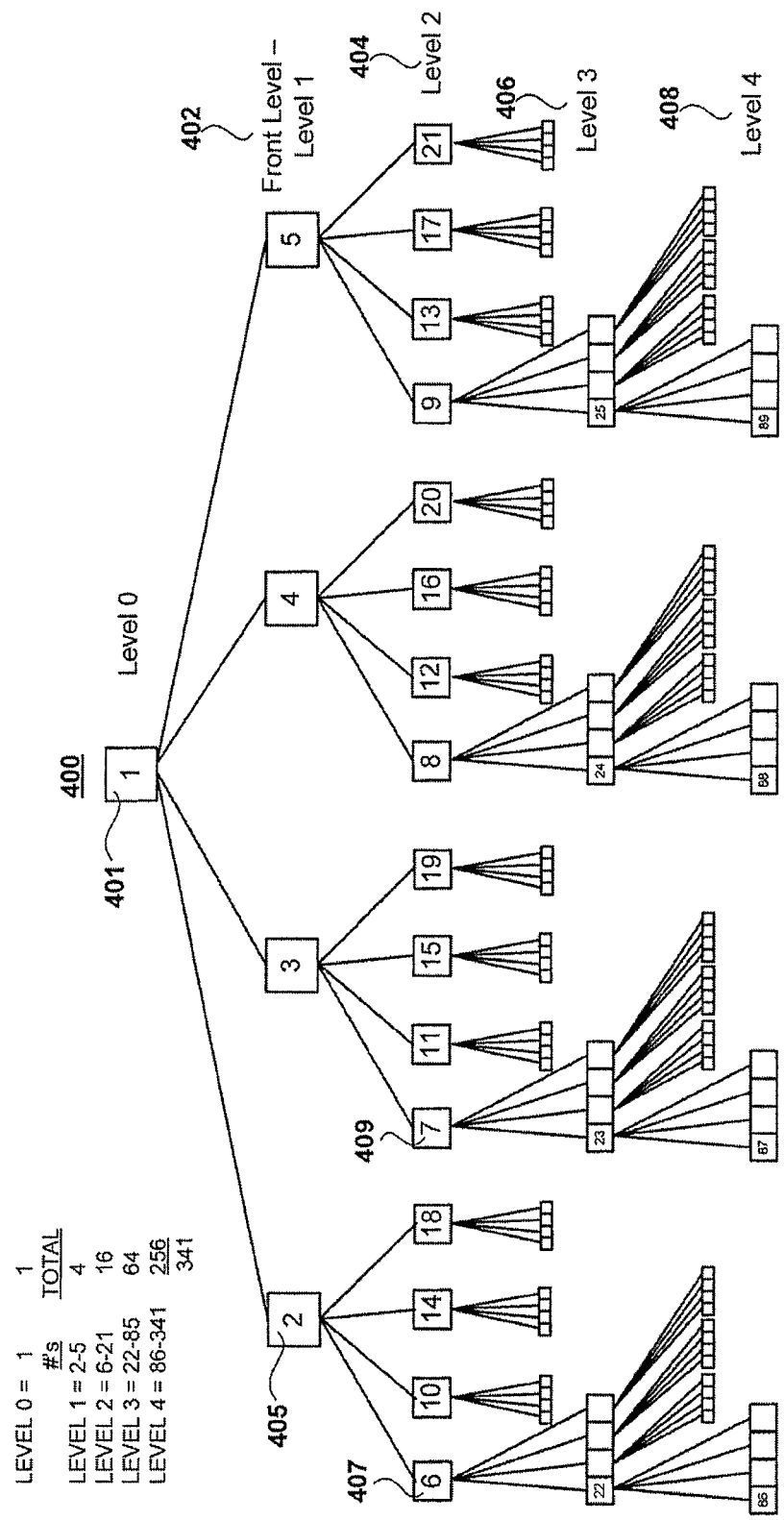
FIG. 4A illustrates a performance driven floating structural compensation plan before periodic repositioning.

Some embodiments of the present invention, described with reference to FIG. 4A, may comprise a performance driven floating structural compensation plan 400, which may resemble a traditional alternating forced matrix hierarchy utilizing a left to right placement plan for adding newly enrolled referring customers. The performance driven floating structural compensation plan 400 may comprise a first referring customer or customer 1 401, with a frontline or level 1 402 of referring customers placed under them with less production points for that compensation period. The frontline or level 1 402 referring customers are placed from left to right in the matrix based on production points for that compensation period with the second highest referring customer or customer 2 405 being placed in the first position on the left with additional referring customers added to the right until the level is full. A second level, or level 2 404, may comprise additional referring customers placed under each of the level 1 402 referring customers. These level 2 404 referring customers may have less production points than the referring customers on level 1. The level 2 404 referring customers may be placed from left to right in the matrix based on production points for that compensation period with the highest referring customer in level 2 or customer 6 407 being placed in the first position on the left under customer 2 405 and the second highest referring customer in level 2 or customer 7 409 being placed in the first position on the left under customer 3, and so forth. A third level, or level 3 406, may further comprise additional referring customers placed under each of the level 2 404 referring customers. A fourth level, or level 4 408, may further comprise additional referring customers placed under each of the level 3 406 referring customers in the same left to right order as level 2. Additional levels may be added as needed. One exemplary embodiment of a 4×4 performance driven floating matrix 400, with 4 levels and 341 customers, is shown.

Figure 4B:
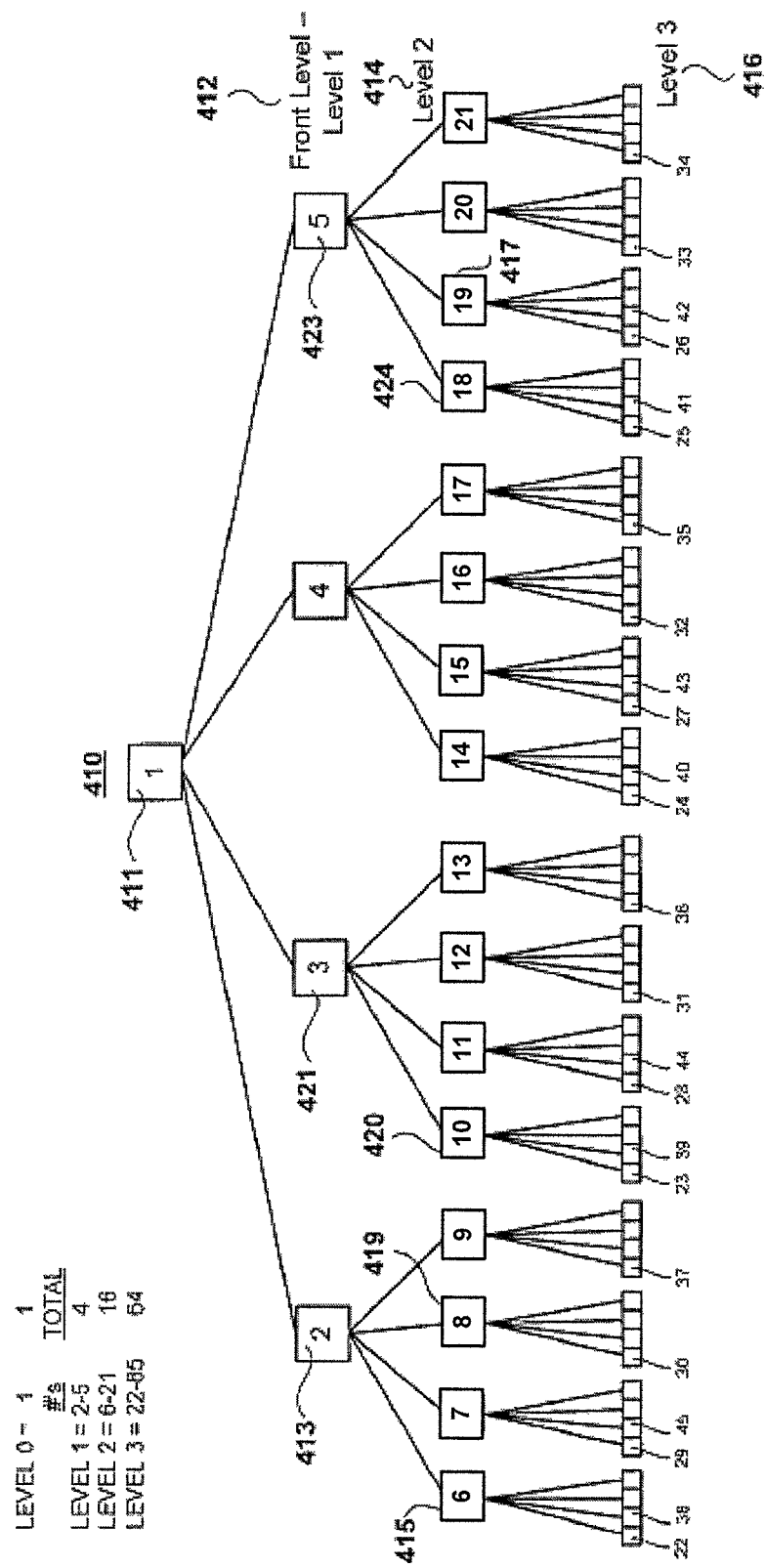
FIG. 4B illustrates a retail customer referral compensation program with a L-R placement.

Some embodiments of the present invention, described with reference to FIG. 4B, may comprise a performance driven floating structural compensation plan 410, which may resemble a traditional alternating forced matrix hierarchy utilizing a left to right placement plan for placing referring customers. The performance driven floating structural compensation plan 410 may comprise a first referring customer or customer 1 411, with a frontline (level 1) 412 of referring customers placed under them. A second level, or level 2 414, may comprise additional referring customers placed under each of the level 1 412 referring customers. These level 2 414 referring customers will have less production points than the referring customers on level 1. The level 2 414 referring customers may be placed in a left to right placement in the matrix based on production points for that compensation period with the highest referring customer in level 2, or customer 6 415, being placed in the first position on the left under customer 2 413 and the second highest referring customer in level 2, or customer 7 420, being placed in the second position on the left under customer 2 413, and so forth across the level. Once all the positions under a customer are filled the next referring customer will be placed in the first position under the next referring customer in the level above. Additional levels may be added as needed.

As discussed briefly with reference to FIG. 1, in some embodiments, the number of positions in the performance driven floating structural compensation plan is based on the number of products sold during the last compensation period. For example, if 10,000 products were sold during the prior compensation period then 10,000 positions within the performance driven floating structural compensation plan may be available to be filled with referring customers who participate in the bonus payout plan. In some embodiments, the positions within the performance driven floating structural compensation plan designated for the highest production point earners are the positions selected to participate in the bonus payout plan. Continuing the example, if 10,000 products are sold in the prior compensation period, then in the current compensation period the top 10,000 positions are designated for the top 10,000 production point earners who may then be selected to participate in the bonus payout plan.

In some embodiments, the number of positions in the performance driven floating structural compensation plan is based on a multiple of the number of products sold during the last compensation period. For example, each of the products sold by a company may be assigned a specified unit value. High priced products may be assigned high unit values and low priced products may be assigned lower unit values. When a product is sold the number of units assigned to that product is included in a company tally. At the end of each compensation period the total number of tallied units may represent the number of positions in the performance driven floating structural compensation plan. However, for simplification purposes, the remaining description and examples will assume that the number of positions in the performance driven floating structural compensation plan is based on the number of products sold during the last compensation period.

In some embodiments, a periodic repositioning of referring customers in the performance driven floating structural compensation plan may be performed and positions may be determined based upon production points awarded in the plan before every commission run. Production points may be awarded based on performance criteria that produce sales and production such as; enrolling in an auto-purchase program, signing-up customers on an auto-purchase program, a referring customer's personal genealogy downline such as personally enrolling other referring customers, the number of personally enrolled second level customers, the number of personally enrolled third level customers, the number of personally enrolled fourth level customers, the number of personally enrolled $M^{th}$ level customers, where M represents either a fixed or an unlimited number of generational levels, as well as total group volume.

In some embodiments, described with reference to FIG. 5A, a referring customer may be awarded production points based on performance criteria 501 that produce sales and production in a given compensation period. New referring customers may be awarded twelve "jumpstart" points for signing-up on an auto-purchase program that will be reduced by one point for each month they do not enroll another active customer into the program. The referring customer may never lose more than the original twelve points over any period of time. If the new referring customer enrolls one or more new active customers in any month they may keep their remaining jumpstart points. If the new referring customer has no new enrollees in any month they lose one of the original jumpstart points. This process may continue until all twelve jumpstart points have been lost, thereby giving new people another opportunity to move up in the marketing plan ahead of those that don't perform. A new referring customer may also be awarded one production point for each consecutive month they are personally enrolled in the auto-purchase program. These are the only points in the plan that may accumulate. If the referring customer cancels his auto-purchase they will lose all points accumulated. This rewards activity and commitment and helps new referring customers advance in the plan.

In another embodiment, a referring customer may be awarded production points for achieving different performance criteria 503 in a given month. For example, 12 points may be awarded for signing-up on an auto-purchase program, 15 points may be awarded for having 3 personally enrolled enrolling customers (5 points each), 15 points may be awarded for having 5 personally enrolled second level customers (3 points each), 20 points may be awarded for having 10 personally enrolled third level customers (2 points each) for a total of 62 total monthly production points. In another embodiment, a referring customer may be awarded production points for achieving performance criteria 505 in a given month. In one embodiment, 12 points may be awarded for signing-up on an auto-purchase program with an additional 3 points awarded for remaining an auto-purchase customer for 3 consecutive months (1 point each per month). An additional 25 points may be awarded for having 5 personally enrolled enrolling customers (5 points each), 45 points may be awarded for having 15 personally enrolled second level customers (3 points each), 40 points may be awarded for having 20 personally enrolled third level customers (2 points each), and 18 points may be awarded for having 18 personally enrolled fourth level customers (1 point each). An additional 20 production points may also be awarded for having 5 personally enrolled retail or auto-purchase customers (4 points each) for a total of 163 monthly production points.

In still another embodiment, another referring customer may be awarded even more production points for achieving additional performance criteria 507 in a given month. For example, 12 points may be awarded for signing-up on an auto-purchase program with an additional 8 points awarded for remaining an auto-purchase customer for 8 consecutive months (1 point each per month). An additional 50 points may be awarded for having 10 personally enrolled enrolling customers (5 points each), 150 points may be awarded for having 50 personally enrolled second level customers (3 points each), 500 points may be awarded for having 250 personally enrolled third level customers (2 points each), 400 points may be awarded for having 400 personally enrolled fourth level customers (1 point each) and 10 points may be awarded for having a $25,000 personal group volume for a total of 1130 monthly production points.

In some embodiments, production points may also be awarded for training and attendance at company sponsored events. points may be awarded for attending a training class and completing a test upon completion. Different point values may be awarded depending on the complexity and importance of the course.

In some embodiments, described with reference to FIG. 5B, referring customer "A" 511 may be awarded a total of 62 production points 512 for the compensation period. Another referring customer, customer "Q" 513 may be awarded a total of 1130 production points 514 in the same compensation period. After having been awarded the most production points for the compensation period, customer "Q" 513, who was awarded 1130 production points 514, would be relocated to the number 1 position 515 in the performance driven floating compensation structure. Customer "A" 511, who was awarded 62 production points 512, the least amount for the compensation period, would therefore be relocated to the last position 516 in the performance driven floating compensation structure. The other referring customers would also be relocated similarly within the performance driven floating compensation structure according to the amount of production points awarded and the placement plan used.

Figure 6:
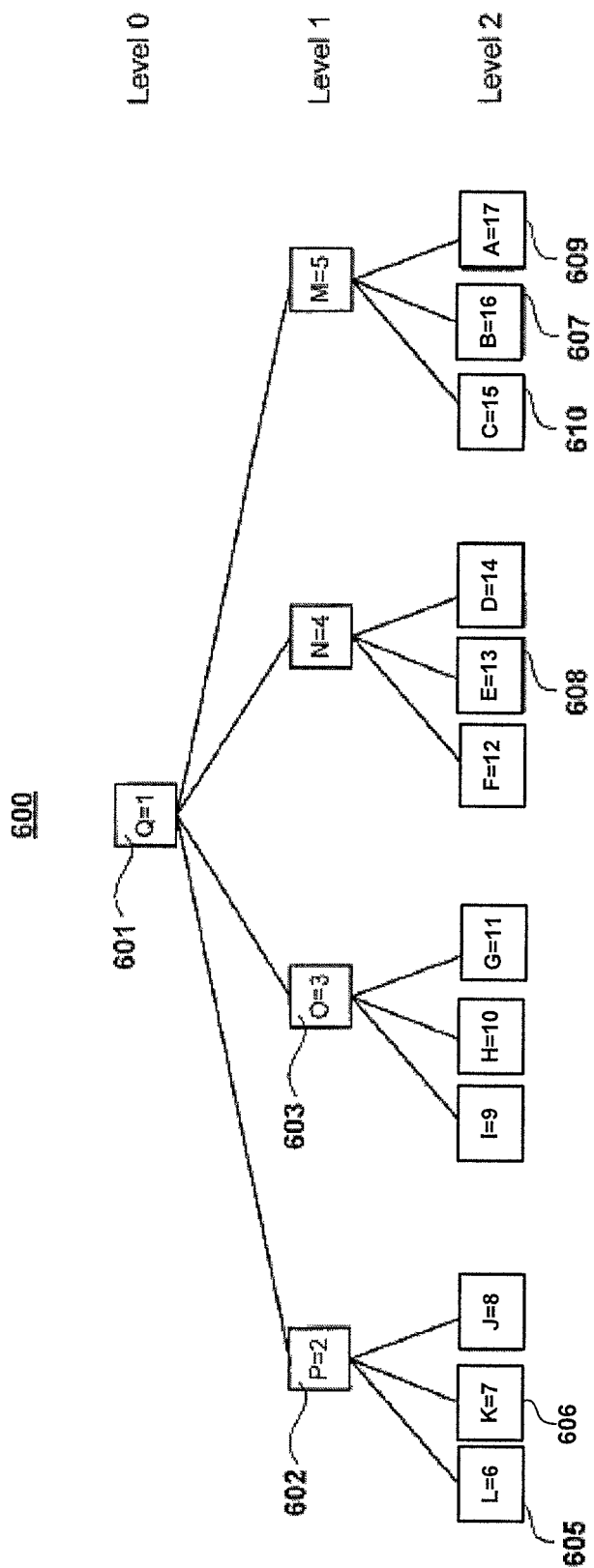
FIG. 6 illustrates an exemplary performance driven floating structural compensation plan after repositioning from application of production points.

Some embodiments of the present invention, described with reference to FIG. 6, may comprise a repositioned performance driven floating compensation structure 600 with customer "Q" relocated to the number 1 position 601 of the structure. Other customers in the repositioned performance driven floating compensation structure 600 may now also occupy new positions based upon production points earned in the compensation Period and may now comprise a new frontline or level 1 of participating customers with customer "P" 602, with the second highest amount of production points, now occupying the first position on the front level, or level 1, beneath customer "Q" 601 and customer "0" 603, with the third highest amount of production points, occupying the second position on level 1 continuing on until level 1 is filled. Referring customers may then be placed on the next level down, or level 2, with the referring customer with the next highest amount of production points, such as customer "L" 605, now occupying the first position on the next level, level 2, beneath customer "P" 602 and customer "K" 606 occupying the second position to the left beneath customer "P" 602 and so forth.

In some embodiments of the present invention, participants may generate retail commissions through product sales for the referring customer who personally enrolled them in the plan. In one exemplary embodiment, with a product wholesale price of $30, a rersonal enroller may earn a $10 commission for each $40 product sold to a personally enrolled retail customer and a $5 retail commission for each $35 product sold to a personally enrolled referring or retail customer.

In some embodiments, retail commissions may be earned each month for the activity of personally sponsored customers and additional points may be earned based on a referring customer's personally enrolled genealogy. These additional points may be needed in order to qualify for the compensation plan's bonus pools. Bonus pools may award qualifying enrolling customers with additional commission percentages or with additional points. In some embodiments, one bonus pool may require 25,000 points and another may require 50,000 points. In order to prevent these bonus pools from being too easily attained, in some embodiments, points may only be earned through a limited number of personally sponsored generation levels. For example, in some embodiments, points may only be earned through 5 personally sponsored generation levels while in others points may be limited to 10, 20 or an unlimited amount of personally sponsored generations depending on the bonus pool attainment goals and difficulty desired. Other qualifications, such as point requirements, may also be adjusted as needed.

As mentioned above, in some embodiments, a bonus pool may require 25,000 points while another bonus pool may require 50,000 points to qualify. Points may only be earned through 5 personally sponsored generation levels. If a referring customer personally sponsored four other referring customers on their frontline or first level and each subsequent referring customer sponsored 4 more referring customers on their frontlines through the 5 generation levels the original referring customer would have a personal genealogy with 4 customers on the first level, 16 customers on the second level, 64 customers on the third level, 256 customers on the fourth level and 1024 customers on the fifth level for a total of 1364 customers. If all 1364 customers bought one product in a month with a wholesale price of $30 the total volume for the original referring customer would be $40,920. If one point were awarded for each dollar in volume the original referring customer would earn 40,920 points, which would qualify him for the 25,000 point bonus pool but not for the 50,000 point bonus pool.

Some embodiments of the present invention may comprise global matching bonus pools. In some embodiments, the global matching bonus pools may be shared on a periodic basis with qualified referring customers. The global matching bonus pools may be made up from the total wholesale volume of the retail customer referral compensation program. In some embodiments, the global matching bonus pools may comprise different individual matching bonus pools with the first matching bonus pool paying a certain percent bonus to participating referring customers. In some embodiments, a referring customer may participate in some of the matching bonus pools one time only. To participate, a referring customer may have to have a certain number of personally enrolled active customers below them. The share of the personally enrolled active customer may be split with their qualified personal enroller or the next qualified upline referring customer following the personal enroller genealogy. Some embodiments may also comprise another matching bonus pool, which may pay an additional percent bonus. To participate, a referring customer may need a greater number of personally enrolled active referring customers below them in their downline. The periodic share of the participating personally enrolled active referring customers will be split with their qualified personal enroller or the next qualified upline personal enroller following the personal enroller genealogy.

Some embodiments may comprise still another matching bonus pool, which may pay an additional percent bonus. A referring customer may participate in this matching bonus pool repeatedly. To participate, a referring customer may need to have a set number of personally enrolled active customers below them in their downline and have reached a specified dollar volume in personally enrolled group autopurchase volume, plus be actively qualified in the company's standard compensation plan. This shared bonus may be based on pro-rata of total personal group volume. This bonus pool may also be added to the other matching bonus pools until a member qualifies. The monthly share of the participating referring customer may be split with their qualified personal enroller or the next qualified upline referring customer following the personal enroller genealogy.

Some embodiments of the present invention may comprise yet another matching bonus pool, which may pay an additional percent bonus. A referring customer may participate in such a matching bonus pool repeatedly. To participate, a referring customer may have to achieve a set number of personally enrolled active referring customers below them in their downline and have reached an even higher specified dollar amount in personally enrolled group auto-purchase volume, plus be actively qualified in the company's standard compensation plan. This shared bonus may be based on pro-rata of total personal group volume. This bonus pool may also be added to another matching bonus pool until a member qualifies. The share of the participating referring customer may be split with their qualified personal enroller or the next qualified upline referring customer following the personal enroller genealogy.

As will be understood by those of skill in the art, in some embodiments additional global matching bonus pools are available to qualifying referring customers. In some embodiments up to three global matching bonus pools are offered. In yet other embodiments more than 10 global matching bonus pools are offered, wherein each global matching pool requires the referring customer to achieve a set number of personally enrolled active referring customers below them in their downline and have reached an even higher specified dollar amount in personally enrolled group auto-purchase volume. In some embodiments, various other qualifying criteria are established, as will be understood by those of skill in the art.

In one preferred embodiment of the present invention, the global matching bonus pools may comprise 4 different individual levels or matching bonus pools with the first matching bonus pool paying a 2 percent bonus to participating referring customers. A referring customer may participate in the first matching bonus pool one time only. To participate, a referring customer must have 4 personally enrolled active referring customers below them. The monthly share of the participating referring customer will be split with their qualified personal enroller or the next qualified upline referring customer following personal enroller genealogy. Embodiments of the present invention may also comprise a second matching bonus pool, which may also pay a 2 percent bonus. A referring customer may participate in the second matching bonus pool only one time. To participate, a referring customer must have 8 personally enrolled active referring customers below them in their downline. The monthly share of the participating referring customer will be split with their qualified personal enroller or the next qualified upline referring customer following personal enroller genealogy.

Embodiments of the present invention may also comprise a third matching bonus pool, which may pay a 4 percent bonus. A referring customer may participate in the third matching bonus pool repeatedly every compensation period, such as every month. To participate, a referring customer must have a set number of personally enrolled active referring customers below them in their personal genealogy (in an exemplary 4×4 matrix a referring customer must have 8 personally enrolled active referring customers below them) and have reached a specified volume, such as $25,000, in personally enrolled group auto-purchase volume plus be actively qualified in the company's standard compensation plan. This shared bonus is based on pro-rata of total personal group volume. This bonus pool is added to the second matching bonus pool until a member qualifies. The monthly share of the participating referring customer will be split with their qualified personal enroller or the next qualified upline referring customer following personal enroller genealogy.

Some embodiments of the present invention may also comprise a fourth matching bonus pool, which may pay an additional 4 percent bonus. A referring customer may participate in the fourth matching bonus pool repeatedly every month or every compensation period. To participate, a referring customer must have a set number of personally enrolled active referring customers below them, (in an exemplary 4×4 matrix a referring customer must have 8 personally enrolled active referring customers below them) in their downline and have a reached a higher specified volume, such as $50,000, in personally enrolled group auto-purchase volume plus be actively qualified in the company's standard compensation plan. This shared bonus is based on pro-rata of total personal group volume. This bonus pool is added to either the second or third matching bonus pools until a member qualifies. The monthly share of the participating referring customer will be split with their qualified personal enroller or the next qualified upline referring customer following personal enroller genealogy.

Other embodiments of the present invention may comprise a personal enroller matching bonus payout plan with dynamic compression wherein 100% of distribution of commissions for commissionable volume after retail profit is moved to the next available qualified position if a referring customer does not qualify. The dynamic compression of the personal enroller matching bonus payout plan maximizes a referring customer's payout so that when qualifications aren't met all available unpaid commissions are automatically "compressed" and rolled-up the line to the next qualified referring customer in order to maximize their payout instead of going back to the company.

Figure 7:
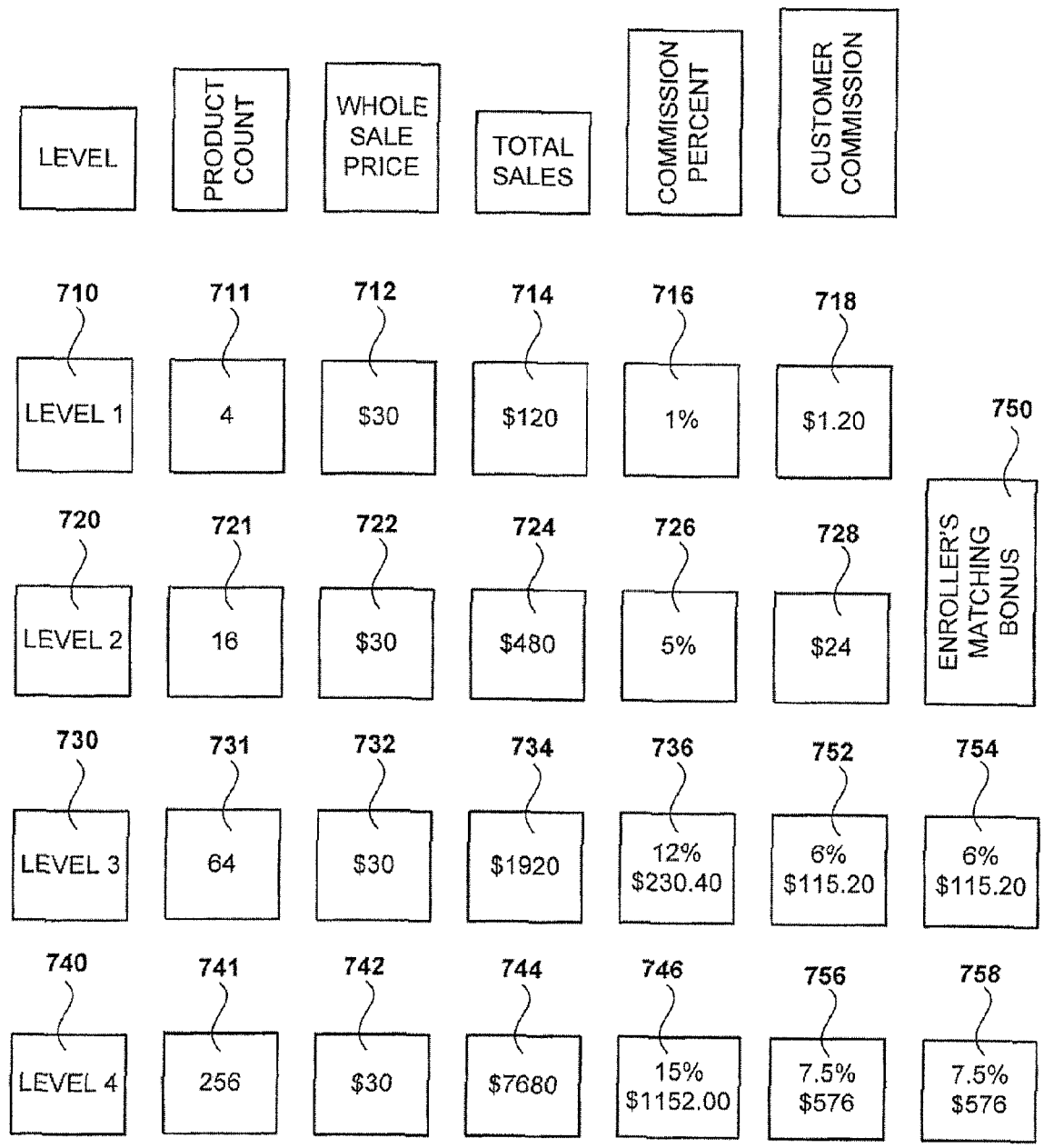
FIG. 7 illustrates a preferred embodiment of a retail customer referral compensation program commission and bonus payout plan with a personal enroller matching bonus.

FIG. 7 illustrates an embodiment wherein a referring customer is positioned in a floating structure based on the number of production points they earned in the previous compensation period. According to this plan, a referring customer is entitled to be compensated based on their position within the performance driven floating structure—a 4×4 matrix in this example.

In a 4×4 performance driven floating matrix plan each referring customer is capable of receiving a commission for referring customers on their first four levels. For example, FIG. 7 illustrates the commission structure for a referring customer in a performance driven floating matrix plan having at least four levels below her in the matrix. In a 4×4 matrix, the referring customer is limited to 4 referring customers on their frontline or first level. Likewise, each referring customer on the first level has a maximum of four people on their first level. Accordingly, in a 4×4 matrix, there is a maximum of 16 people on a referring customer's 2nd level, and so on until your organization reaches a depth of 4 levels. Additional customers are moved down to the first available position and automatically added, following one of the placement plans explained above, until the level is filled. In a full 4×4 matrix this would provide for a second level with 16 referring customers, a third level with 64 referring customers and a fourth level with 256 referring customers. All active referring customers may be qualified for payout on the first two levels. To qualify for payout on levels 3 and 4 a personal enroller must have the corresponding number of personally sponsored referring customers. If the personal enroller does not qualify, the matching bonus rolls up to the first qualified personal enroller, following personal enroller genealogy.

In some embodiments, described with reference to FIG. 7, a product has a retail price of $40, a discounted auto-purchase price of $35, and a wholesale price of $30. In this embodiment, a referring customer earns a $5 retail commission on each personally sponsored auto-purchase sale and $10 retail commission on each personally sponsored retail sale. The remaining $30 wholesale price is revenue that is commissionable in a bonus payout plan.

FIG. 7 illustrates one embodiment of how wholesale revenue from within a business network is distributed via a bonus payout plan. This embodiment assumes that each of the four levels illustrated are filled with a referring customer, and that each of the four levels 710, 720, 730, and 740 include positions selected to participate in the bonus payout plan. As shown, the bonus payout plan includes a level 1 710 payout of $1.20 718 based on a product count of 4 711 and a wholesale price of $30 712 for a total sales volume of $120 714 and a level 1 commission of 1% 716. The bonus payout plan comprise a level 2 720 payout of $24 728 based on a product count of 16 721 and a wholesale price of $30 722 for a total sales volume of $480 724 and a level 2 commission of 5% 726.

As further illustrated in FIG. 7, the bonus plan also comprises a level 3 730 payout of $230.40 736 based on a product count of 64 731 and a wholesale price of $30 732 for a total sales volume of $1920 734 and a level 3 commission of 12% 736 which may be split with the referring customer's personal enroller. As explained above, the referring customer's personal enroller is the person who enrolled the referring customer. For a personal enroller to qualify for a matching enroller bonus of 6% 754 on level 3, they must also have the corresponding number of personally enrolled referring customers. If the personal enroller does not qualify the matching bonus rolls upline in the matrix to the first personally enrolled upline referring customer that qualifies following personal enroller genealogy.

The bonus payout plan of FIG. 7 also comprises a level 4 740 payout of $1152 746 based on a product count of 256 741 and a wholesale price of $30 742 for a total sales volume of $7,680 744 and a level 4 commission of 15% 746 which may be split with the referring customer's personal enroller. For a personal enroller to qualify for a matching enroller bonus 758 of 7.5% on level 4, they must have the corresponding number of personally enrolled referring customers. If the personal enroller does not qualify, the matching bonus rolls up the matrix to the first personally enrolled upline referring customer that does qualify following personal enroller genealogy.

In summation, FIG. 7 illustrates one embodiment of a performance driven floating matrix plan, wherein a Referring customer is capable of receiving compensation within a compensation period for the persons in her lower four levels within the performance driven floating matrix. In addition, the referring customer can receive additional compensation if she is a personal enroller and if she and the person enrolled qualify for a matching bonus. Accordingly, this plan encourages referring customers to consistently earn production points, so that after each compensation period she is positioned high within the performance driven floating structure, having many persons in lower levels than she such that she qualifies for matching bonuses, as described above and illustrated in FIG. 7.

Figure 8:
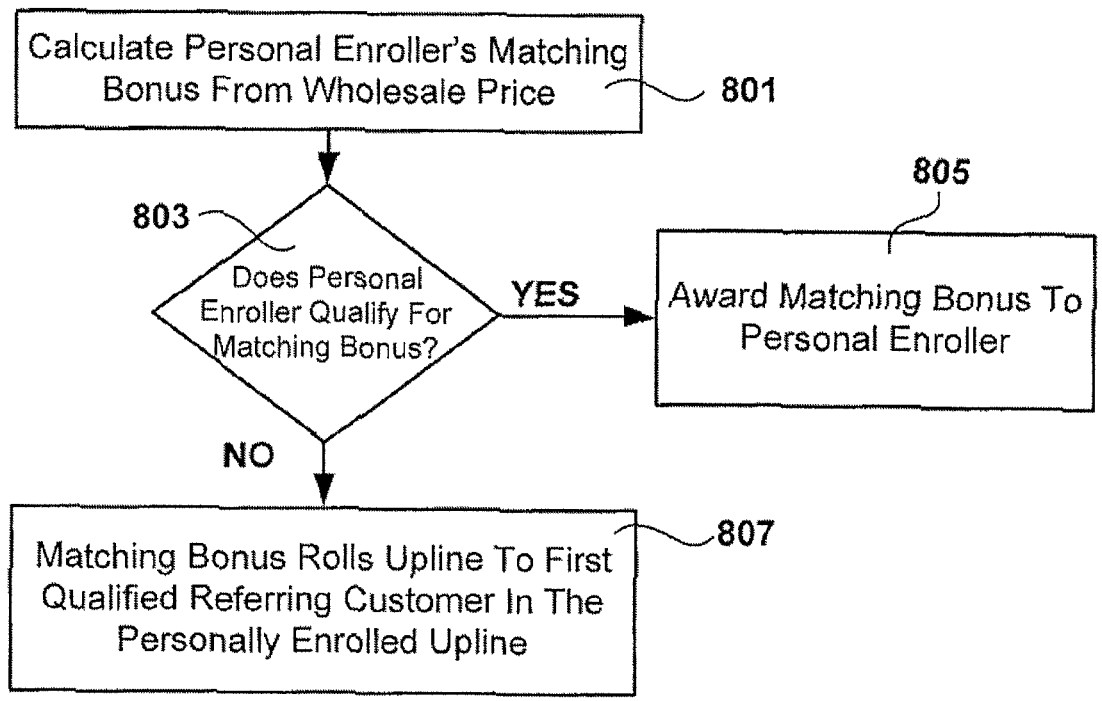
FIG. 8 illustrates a flowchart of a preferred method of awarding a personal enroller matching bonus.

In another embodiment, described with reference to FIG. 8, a personal enroller's matching bonus is calculated 801 from the wholesale volume of product sold for a specified compensation period. If the personal enroller qualifies 803 for the matching personal enroller bonus the bonus is awarded 805 to him. If the personal enroller does not qualify for the matching bonus the matching bonus is rolled upline 807 to the first qualified referring customer in the personally enrolled upline.

Figure 9:
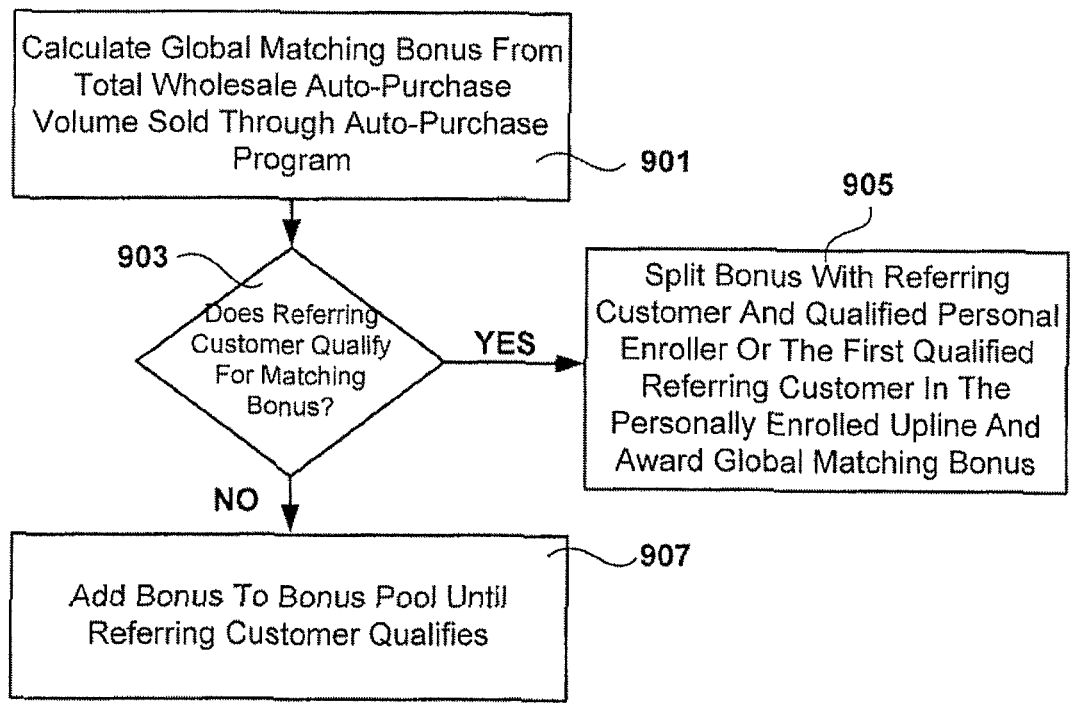
FIG. 9 illustrates a flowchart of a preferred method of awarding global matching bonuses.

In still other embodiments, described with reference to FIG. 9, a global matching bonus is calculated 901 from the total wholesale auto-purchase volume sold through the auto-purchase program for a specified compensation period. If a referring customer qualifies 903 for the global matching bonus, the bonus is split 905 between the referring customer and the qualified personal enroller or the first qualified upline referring customer and the bonus is awarded. If the referring customer does not qualify for the global matching bonus, the global matching bonus is added 907 to the global matching bonus pool until the referring customer does qualify.

While the examples provided in the description above relate primarily to an illustrative performance driven floating 4×4 matrix structure, additional floating structures are contemplated by the present invention as well. As mentioned above, some non-limiting examples may include floating breakaway, uni-level, staristep or step-level, binary, matrix, or other hybrid compensation plans. Although various floating structures may be employed to implement the teachings of the present invention, the methods of earning and being awarded production points, of earning and receiving commissions, and of qualifying for and participating in the various bonus pools remains largely as described above.

In some embodiments, a floating structure may be used in connection with other existing retail or network marketing plans and/or structures or it may be used as an independent plan. For example, a network marketing company that currently employs a traditional fixed position structure could either modify the existing structure or create a separate structure implementing the floating concepts of the present invention. Continuing the example, the company could also continue to maintain a separate genealogical structure for organizational purposes such as individual rate, rank and the like. While a genealogical structure may be maintained for organizational purposes, actual downline commissions may be derived from the floating structure, including those outside of one's personal genealogy. In some embodiments, the floating compensation plan can be used in connection with all products and sales while in other embodiments it can be limited to only a portion of products and/or sales to enhance flexibility and efficacy.

With regard to the various floating structures available, a floating structure may initially be established or selected. In some embodiments, the shape or structure of the performance based compensation plan may be determined in advance. In such embodiments, the number of positions filed within the structure may change from pay cycle to pay cycle. This may be determined based on commissionable volume. Accordingly, the depth and width of the structure (i.e. the structures size as opposed to its shape) may subsequently be determined by dividing either the number of products sold or the number of units sold (based on the number of units assigned to individual products) by the number of positions that would be filed by those sales or units. In some embodiments, this may result in a final level which is only partially filed because the products or units sold do not result in filled positions on the entire final level. In other embodiments, such as embodiments employing a single leg matrix structure, every level has only one position so each level will be completely filled by filling all of the positions allotted based on commissionable volume. For example, if the total product or unit sales equals 17,749, then a single leg plan would have exactly 17,749 positions and the structure would be 17,749 levels deep with each level filled.

In some embodiments, after the desired structure has been established and the number of available positions has been identified, each position may be filled with an individual purchase, a dollar amount, or a unit depending on company preference. In such embodiments, at the end of the pay cycle each purchase position may then be correlated with a commission qualified representative based on that representative's performance during the pay cycle. Based on the performance based assignment, commissions may be calculated and paid to the appropriate representative. The foregoing method may be used to fill all floating structures regardless of their depth, size or overall structure.

In addition to the floating 4×4 matrix example provided and discussed above, another exemplary floating structure incorporating the teachings of present invention may include a single leg type matrix. The remaining discussion and associated figures illustrate some embodiments of a floating or repositioning single leg matrix compensation plan. As discussed above, a floating single leg matrix structure may be chosen in advance and the number of positions within the floating single leg matrix may be determined based on commissionable volume each pay cycle. Since each level of a single leg structure only includes a single position, the levels in such a structure will correspond identically to the number of positions in the structure.

Figure 10:
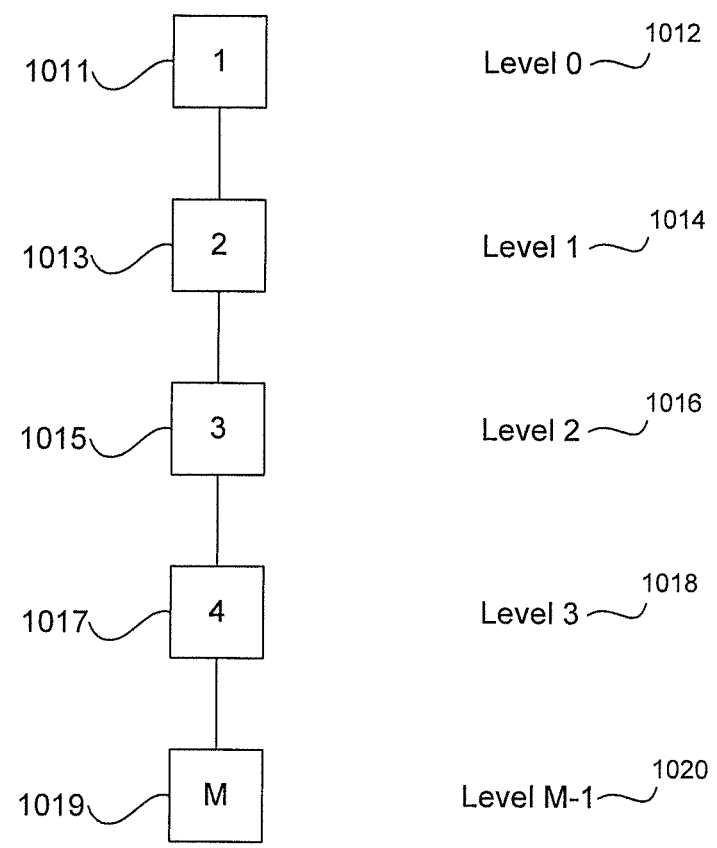
FIG. 10 illustrates another performance driven floating structural compensation plan periodic repositioning based on total points with a top down placement.

With reference to FIG. 10, a performance driven floating single leg (1×M) matrix 1010 having 5 levels is illustrated. The floating single leg matrix may resemble a traditional fixed single leg matrix structure. In some embodiments, production points may be awarded for achieving performance based criteria and totaled each compensation period for each referring customer in the downline. Each referring customer may then be assigned a numbered position from highest to lowest depending on the total points earned in the program that compensation period.

One embodiment of a performance driven floating single leg matrix 1010, with 5 levels and 5 customers, may comprise a first referring customer or customer 1 1011 on level 0 1012, with the most production points earned for that compensation period, and level 1 1014 placed directly below customer 1 1011 comprising a referring customer with less production points for that compensation period, which in this embodiment is customer 2 1013 having the second most amount of production points. Level 2 1016 is then placed under customer 2 1013 comprising a referring customer with less production points for that compensation period with customer 3 1015 having the third most amount of production points and so forth in order of the amount of production points earned, from top to bottom, continuing on down to the referring customer with the least amount of production points for the compensation period, customer M 1019, being placed in the final spot under customer 4 1017 where M represents either a fixed or an unlimited number of customers placed in the performance driven floating single leg matrix. Additional levels may be added as needed corresponding to level M-1 1020 where M represents either a fixed or an unlimited number of customers placed in the performance driven floating single leg matrix. Within the single leg structure each individual position corresponds to an individual level. Accordingly, the number of positions derived from commissionable volume dictates the exact number of positions available in the floating single leg structure each pay cycle.

In some embodiments, after the single leg structure has been established and the number of available positions has been identified, each position may be filled with an individual purchase, a dollar amount, or a unit depending on company preference. In such embodiments, at the end of the pay cycle each purchase position may then be correlated with a commission qualified representative based on that representative's performance during the pay cycle. Based on the performance based assignment, commissions may be calculated and paid to the appropriate representative. Commissions may be calculated based on the number of pay levels and the percentages assigned to those levels. In a floating single leg structure, every level will be filled since each level has exactly one position.

Figure 11:
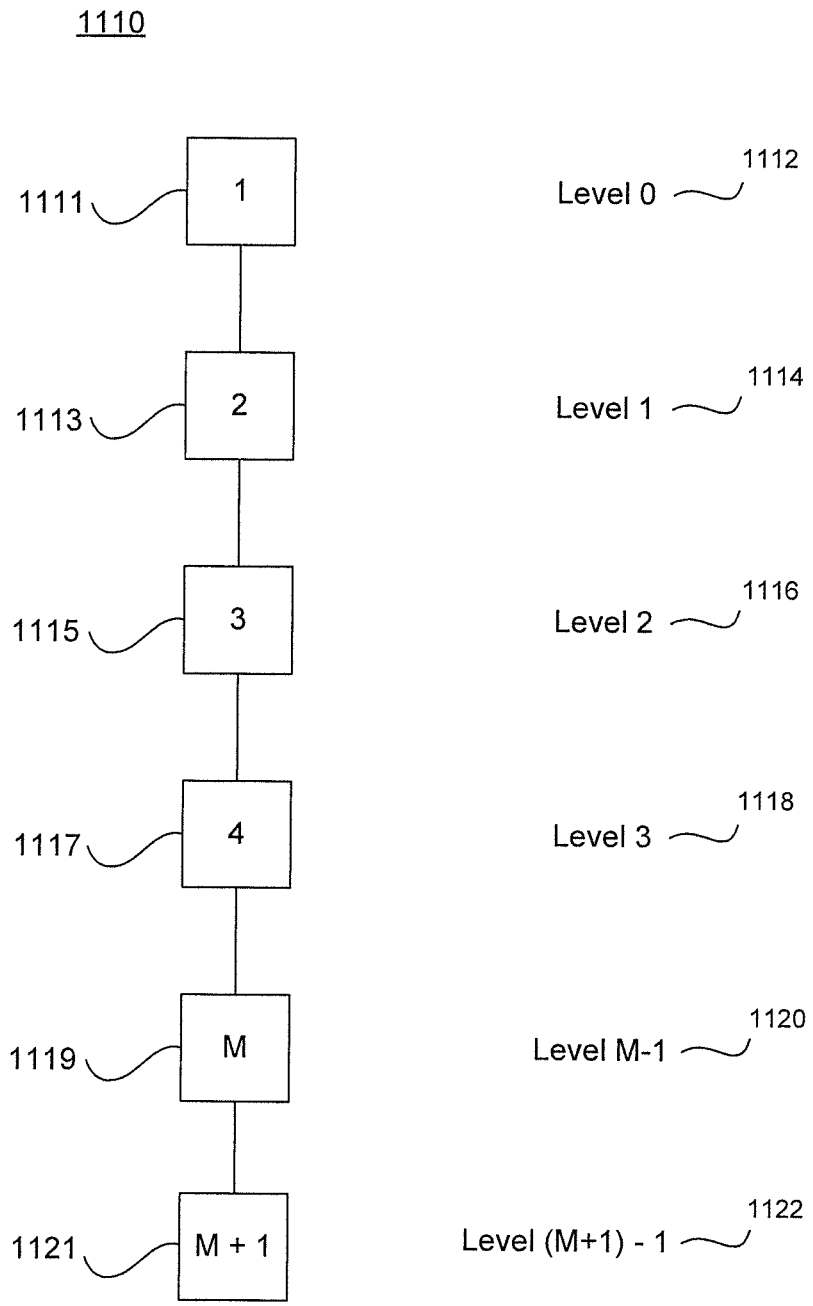
FIG. 11 illustrates another performance driven floating structural compensation plan before periodic repositioning.

FIG. 11 illustrates another embodiment of a performance driven floating single leg matrix, as described with reference to FIG. 10 above, prior to periodic repositioning of the leg's referring customers. Additional levels may be added as needed corresponding to levels M-1 1120 and (M+1)-1 1122 where M represents either a fixed or an unlimited number of customers placed in the performance driven floating single leg matrix. One embodiment of a 1×M performance driven floating single leg matrix is shown having 6 levels and 6 customers.

A periodic repositioning of referring customers in the performance driven floating single leg matrix may be performed and positions may be determined based upon production points awarded in the plan before every commission run. Production points may be awarded based on performance criteria that produce sales and production such as; enrolling in an auto-purchase program, signing-up customers on an auto-purchase program, a referring customer's personal genealogy downline such as personally enrolling other referring customers, the number of personally enrolled first through $M^{th}$ level customers where M represents either a fixed or an unlimited number of generational levels in the performance driven floating single leg matrix, as well as total group volume.

Similar to FIG. 5A discussed above, in some embodiments, described with reference to FIG. 12, a referring customer may be awarded production points based on performance criteria 1201 that produce sales and production in a given compensation period. New referring customers may be awarded 12 "jumpstart" points for signing-up on an auto-purchase program that will be reduced by 1 point for each month they do not enroll another active customer into the program. The referring customer may never lose more than the original 12 points over any period of time. If the new referring customer enrolls one or more new active customers in any month they may keep their remaining jumpstart points. If the new referring customer has no new enrollees in any month they lose 1 of the original jumpstart points. This process may continue until all 12 jumpstart points have been lost, thereby giving new people another opportunity to move up in the marketing plan ahead of those that don't perform. A new referring customer may also be awarded 1 production point for each consecutive month they are personally enrolled in the auto-purchase program. These are the only points in the plan that may accumulate. If the referring customer cancels his auto-purchase they will lose all points accumulated. This rewards activity and commitment and helps new referring customers advance in the plan.

With continued reference to FIG. 12, a referring customer may be awarded production points for achieving different performance criteria 1203 in a given month. For example, 12 points may be awarded for signing-up on an auto-purchase program, 15 points may be awarded for having 3 personally enrolled enrolling customers (5 points each), 4 points may be awarded for having 1 personally enrolled second level customer (4 points each), 3 points may be awarded for having 1 personally enrolled third level customer (3 points each), 2 points may be awarded for having 1 personally enrolled forth level customer (2 points each), 5 points may be awarded for having 5 personally enrolled $M^{th}$ level customers (1 point each) for a total of 41 total monthly production points. In another embodiment, a referring customer may be awarded production points for achieving performance criteria 1205 in a given month. In one embodiment, 12 points may be awarded for signing-up on an auto-purchase program with an additional 3 points awarded for remaining an auto-purchase customer for 3 consecutive months (1 point each per month). An additional 25 points may be awarded for having 5 personally enrolled enrolling customers (5 points each), 4 points may be awarded for having 1 personally enrolled second level customer (4 points each), 3 points may be awarded for having 1 personally enrolled third level customer (3 points each), 2 points may be awarded for having 1 personally enrolled fourth level customer (2 points each), and 45 points may be awarded for having 45 personally enrolled $M^{th}$ level customers (1 point each). An additional 20 production points may also be awarded for having 5 personally enrolled retail or auto-purchase customers (4 points each) for a total of 114 monthly production points.

In still another embodiment, another referring customer may be awarded even more production points for achieving additional performance criteria 1207 in a given month. For example, 12 points may be awarded for signing-up on an auto-purchase program with an additional 8 points awarded for remaining an auto-purchase customer for 8 consecutive months (1 point each per month). An additional 50 points may be awarded for having 10 personally enrolled enrolling customers (5 points each), 4 points may be awarded for having 1 personally enrolled second level customer (4 points each), 3 points may be awarded for having 1 personally enrolled third level customer (3 points each), 2 points may be awarded for having 1 personally enrolled fourth level customer (2 point each), 700 points may be awarded for having 700 personally enrolled $M^{th}$ level customers (1 point each) and 10 points may be awarded for having a $25,000 personal group volume for a total of 789 monthly production points.

In some embodiments of the present invention production points may also be awarded for training and attendance at company sponsored events. Points may be awarded for attending a training class and completing a test upon completion. Different point values may be awarded depending on the complexity and importance of the course.

Figure 13:
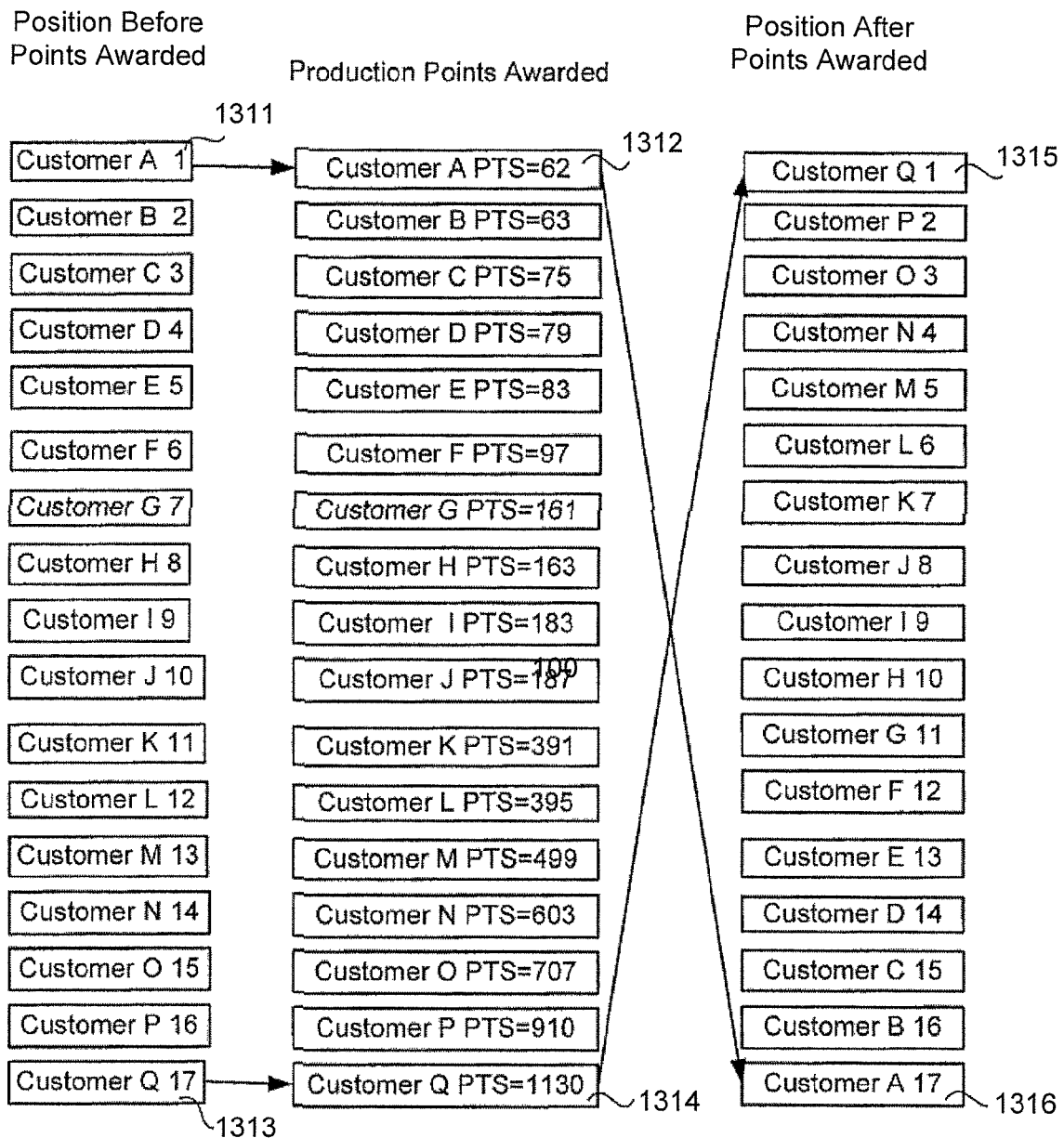
FIG. 13 illustrates another periodic repositioning of referring customers in a performance driven floating structural compensation plan from application of customer awarded production points.

In some embodiments, described with reference to FIG. 13, referring customer "A" 1311 may be awarded a total of 62 production points 1312 for the compensation period. Another referring customer, customer "Q" 1313 may be awarded a total of 1130 production points 1314 in the same compensation period. After having been awarded the most production points for the compensation period, customer "Q" 1313, who was awarded 1130 production points 1314, would be relocated to the number 1 position 1315 in the performance driven floating single leg matrix. Customer "A" 1311, who was awarded 62 production points 1312, the least amount for the compensation period, would therefore be relocated to the last position 1316 in the performance driven floating single leg matrix. The other referring customers would also be relocated similarly within the performance driven floating single leg matrix according to the amount of production points awarded and the placement plan used.

Figure 14:
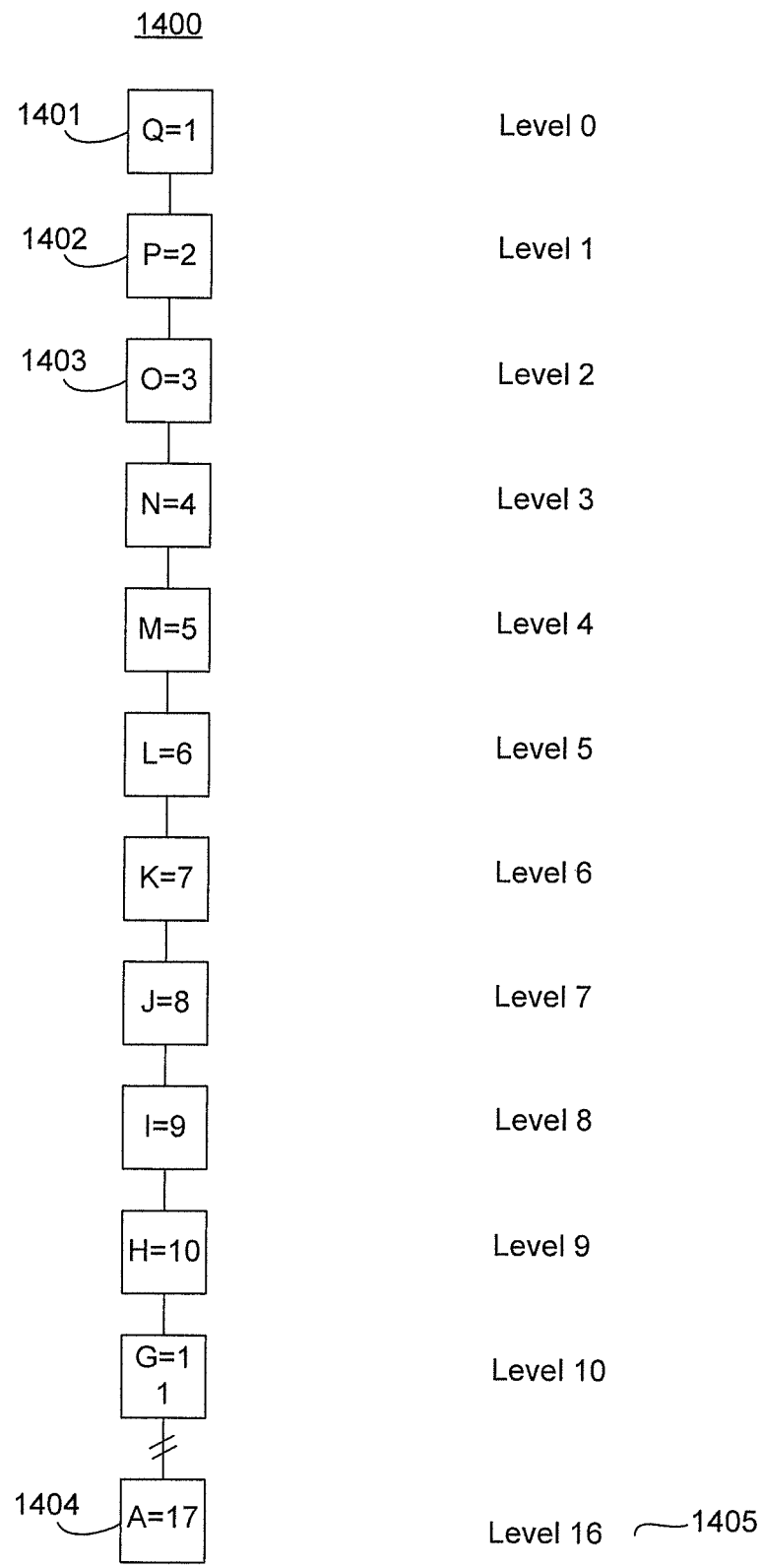
FIG. 14 illustrates another performance driven floating structural compensation plan after repositioning from application of production points.

With reference to FIG. 14, an illustrative embodiment of a repositioned performance driven floating single leg matrix 1400 is shown. As shown in FIG. 14, customer "Q" has been relocated to the number 1 position 1401 of the single leg. Other customers in the repositioned performance driven floating single leg matrix 1400 may now also occupy new positions based upon production points earned in the compensation period and may now comprise a new single leg of participating customers with customer "P" 1402 having the second highest amount of production points, now occupying the first level, or level 1, beneath customer "Q" 1401 and customer "0" 1403, having the third highest amount of production points, occupying the second level, or level 2, and so forth continuing on with the referring customer having the next highest amount of production points, from the top down, until each level is filled. Customer "A" 1404, who was awarded the least amount of production points during the compensation period, may now occupy the last position on level 16 1405 in the repositioned performance driven floating single leg matrix 1400.

In some embodiments of the floating single leg plan, participants may generate retail commissions and/or additional points as discussed in detail above through sales for the referring customer who personally enrolled them in the plan and for the activity of personally sponsored customers and a referring customer's personally enrolled genealogy. Further, in some embodiments of the floating single leg plan, participants may use these additional points to qualify for bonus pools as discussed above. Participation in the bonus pools in the single leg plan, including global matching bonus pools and all other enrolment and/or matching bonus pools, is premised on the same requirements discussed above. For example, one may only participate in the global matching bonus pools once but may repeatedly participate in other matching bonus pools. Such repeated participation, however, may be premised on the achievement of a set number of personally enrolled active customers below a referring customer in their downline and the attainment of a specified dollar volume in personally enrolled group auto-purchase volume plus active qualification for the company's standard compensation plan. See above for a more detailed discussion of retail commissions and bonus pool participation.

Other embodiments of the floating single leg plan may comprise a personal enroller matching bonus payout plan with dynamic compression wherein 100% of distribution of commissions for commissionable volume after retail profit is moved to the next available qualified position if a referring customer does not qualify. The dynamic compression of the personal enroller matching bonus payout plan maximizes a referring customer's payout so that when qualifications aren't met all available unpaid commissions are automatically "compressed" and rolled-up the line to the next qualified referring customer in order to maximize their payout instead of going back to the company.

Figure 15:
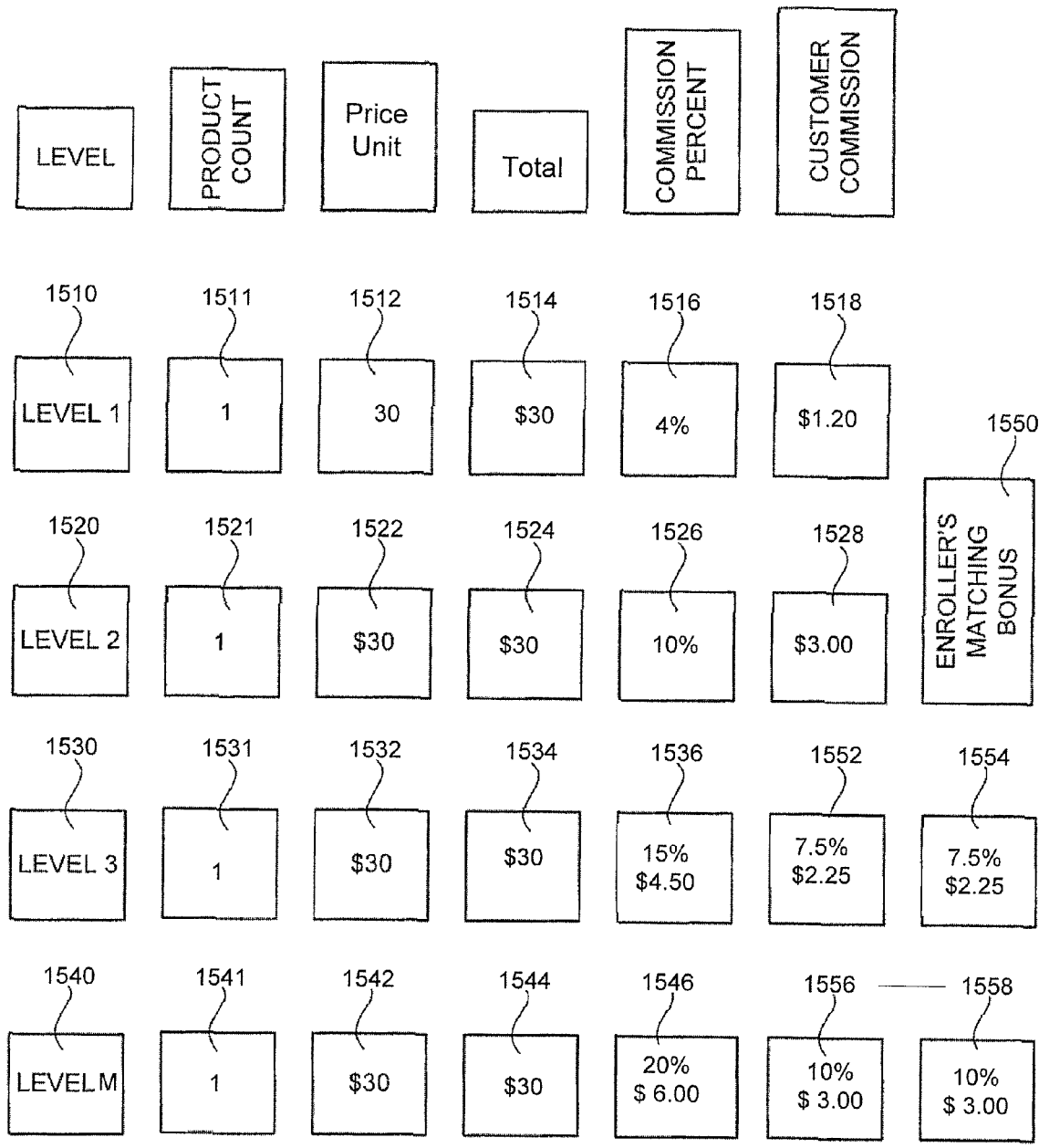
FIG. 15 illustrates another retail customer referral compensation program commission and bonus payout plan with a personal enroller matching bonus.

FIG. 15 illustrates an embodiment wherein a referring customer is positioned in a floating single leg matrix based on the number of production points they earned in the previous compensation period. According to this plan, a referring customer is entitled to be compensated based on their position within the performance driven floating single leg matrix.

In a performance driven floating single leg matrix plan each referring customer is capable of receiving a commission for referring customers on their first M levels, where M represents either a fixed or an unlimited number of generational levels in the performance driven floating single leg matrix. For example, FIG. 15 illustrates the commission structure for a referring customer in a performance driven floating single leg matrix plan having at least 4 levels below her in the single leg. In a single leg, the referring customer is limited to 1 referring customer on her frontline or first level. Likewise, the referring customer on the first level has a maximum of one person on their first level. Accordingly, in a single leg matrix, there is a maximum of 1 person on a referring customer's 2nd level, and so on until the organization reaches a depth of M levels, where M represents either a fixed or an unlimited number of generational levels in the performance driven floating single leg matrix. Additional customers are moved down to the first available position in the single leg and automatically added until the leg is filled. In a full 1×M single leg this would provide for M−1 levels with M referring customers. All active referring customers may be qualified for payout on the first two levels. To qualify for payout on levels 3 through M, a personal enroller must have the corresponding number of personally sponsored referring customers. If the personal enroller does not qualify, the matching bonus rolls up to the first qualified personal enroller, following personal enroller genealogy.

In some embodiments, described with reference to FIG. 15, a product has a retail price of $40, a discounted auto-purchase price of $35, and a wholesale price of $30. In this embodiment, a referring customer earns a $5 retail commission on each personally sponsored auto-purchase sale and $10 retail commission on each personally sponsored retail sale. The remaining $30 wholesale price is revenue that is commissionable in a bonus payout plan.

FIG. 15 illustrates one embodiment of how wholesale revenue from within a business network is distributed via a bonus payout plan. This embodiment assumes that each of the four levels illustrated are filled with a referring customer, and that each of the four levels 1510, 1520, 1530, and 1540 include positions selected to participate in the bonus payout plan. As shown, the bonus payout plan includes a level 1 1510 payout of $1.20 1518 based on a product or unit count of 1 1511 and a wholesale price of $30 1512 for a total sales volume of $30 1514 and a level 1 commission of 4% 1516. The bonus payout plan comprises a level 2 1520 payout of $3.00 1528 based on a product count of 1 1521 and a wholesale price of $30 1522 for a total sales volume of $30 1524 and a level 2 commission of 10% 1526.

As further illustrated in FIG. 15, the bonus plan also comprises a level 3 1530 payout of $4.50 1536 based on a product count of 1 1531 and a wholesale price of $30 1532 for a total sales volume of $30 1534 and a level 3 commission of 15% 1536 which may be split with the referring customer's personal enroller. As explained above, the referring customer's personal enroller is the person who enrolled the referring customer. For a personal enroller to qualify for a matching enroller bonus of 7.5% 1554 on level 3, they must also have the corresponding number of personally enrolled referring customers. If the personal enroller does not qualify, the matching bonus rolls upline in the matrix to the first personally enrolled upline referring customer that qualifies following personal enroller genealogy.

The bonus payout plan of FIG. 15 also comprises a level M 1540 payout of $6.00 1546 based on a product count of 1 1541 and a wholesale price of $30 1542 for a total sales volume of $30.00 1544 and a level M commission of 20% 1546 which may be split with the referring customer's personal enroller. For a personal enroller to qualify for a matching Enroller Bonus 1558 of 10% on level M, they must have the corresponding number of personally enrolled referring customers. If the personal enroller does not qualify, the matching bonus rolls up the matrix to the first personally enrolled upline referring customer that does qualify following personal enroller genealogy.

In summation, FIG. 15 illustrates one embodiment of a performance driven floating single leg matrix plan, wherein a Referring customer is capable of receiving compensation within a compensation period for the persons in her lower M levels within the performance driven floating single leg matrix. In addition, the referring customer can receive additional compensation if she is a personal enroller and if she and the person enrolled qualify for a matching bonus. Accordingly, this plan encourages referring customers to consistently earn production points, so that after each compensation period she is positioned high within the performance driven floating single leg matrix, having many persons in lower levels than she so that she qualifies for matching bonuses as described above and illustrated in FIG. 15.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method, performed by one or more processors of a computer system, for providing a performance driven floating compensation structure for compensating customers enrolled in a multi-level marketing plan based on a position in which a customer is placed within the performance driven floating compensation structure, the method comprising:

generating, by the one or more processors, a performance driven floating compensation structure that includes a plurality of positions arranged hierarchically in a plurality of levels, wherein at least one level includes fewer positions than a layer immediately below the level in the performance driven floating compensation structure, the performance driven floating compensation structure for arranging customers enrolled in a multi-level marketing plan based on performance of the customers in the program;

associating, by the one or more processors, a compensation formula with each position in the performance driven floating compensation structure, wherein the compensation formula for at least one position in one level of the performance driven floating compensation structure is different than the compensation formula for at least one position in a second level of the performance driven floating compensation structure, and wherein a compensation formula for a position at a higher level yields a higher compensation amount than a compensation formula for a position at a lower level;

accessing, by the one or more processors and for each of a plurality of customers in the multi-level marketing plan, a number of production points earned by the customer during a first production period, the production points being earned at least partially by one or more of the following:

enrolling another customer into the multi-level marketing plan;

enrolling another customer into an auto-purchase program; or attending a training event or activity;

placing, by the one or more processors, each customer in the performance driven floating compensation structure based on the number of production points earned by the customer during the first production period such that customers having earned a higher number of production points in the first production period are placed at higher levels in the hierarchy than customers having earned a lower number of production points in the first production period;

calculating, by the one or more processors and for each customer in the performance driven floating compensation structure, a compensation amount to be paid to the customer for performance during the first production period, the compensation amount being calculated based on:

the compensation formula associated with the position in the performance driven floating compensation structure to which the customer was assigned based on the number of production points earned by the customer during the first production period; and an amount of sales generated by the customer during the first production period;

accessing, by the one or more processors and for each of a plurality of customers, a number of production points earned by the customer during a second production period; and repositioning, by the one or more processors, each customer in the performance driven floating compensation structure based on the number of production points earned by the customer during the second production period such that customers having earned a higher number of production points in the second production period are placed at higher levels in the hierarchy than customers having earned a lower number of production points in the second production period, and such that customers receive a compensation amount for sales generated during the second production period based on the compensation formula of the position in the performance driven floating compensation structure to which the customers were repositioned.

2. The method of claim 1, wherein the multi-level marketing plan is selected from the group consisting of:

i. a uni-level plan;

ii. a breakaway plan;

iii. a matrix plan;

iv. a binary plan;
v. a stairstep plan; and
vi. a hybrid plan.

3. The method of claim 2, wherein the multi-level marketing plan is a single leg matrix structure.

4. The method of claim 1, wherein the production period is one month.

5. The method of claim 1, wherein the production points are earned at least partially by one or more of the following:
  i. enrolling in the multi-level marketing plan;
  ii. a number of consecutive production periods that a customer is enrolled in the multi-level marketing plan;
  iii. a number of generations of enrolled customers below the customer in the multi-level marketing plan;
  iv. meeting group sales volume goals; or
  v. completing a segment of a training program.

6. The method of claim 1, wherein, when two or more customers have the same number of production points, a customer having enrolled in the multi-level marketing plan most recently is placed in the performance driven floating compensation structure prior to another customer having the same number of production points.

7. The method of claim 1, further comprising:
  calculating a matching bonus amount for a first customer in the multi-level marketing plan from wholesale price sales volume;
  determining if the first customer qualifies for the matching bonus;
  awarding the matching bonus to the first customer when the first customer qualifies for the matching bonus; and
  when the first customer does not qualify for the matching bonus, awarding the matching bonus to another customer that is positioned in the multi-level marketing plan, the other customer being the first qualified customer in the upline of the first customer.

8. The method of claim 7, wherein the first customer qualifies for the matching bonus if the first customer has a specified amount of personally enrolled active customers in a personal genealogy in the multi-level marketing plan.

9. The method of claim 7, wherein the first customer qualifies for the matching bonus based on the first customer's position in the performance driven floating compensation structure.

10. One or more non-transitory computer readable media storing computer executable instructions which when executed by one or more processors perform a method for providing a performance driven floating compensation structure for compensating customers enrolled in a multi-level marketing plan based on a position in which a customer is placed within the performance driven floating compensation structure, the method comprising:
  generating, by the one or more processors, a performance driven floating compensation struture that includes a plurality of positions arranged hierarchically in a plurality of levels, wherein at least one level includes fewer positions than a layer immediately below the level in the performance driven floating compensation structure, the performance driven floating compensation structure for arranging customers enrolled in a multi-level marketing plan based on performance of the customers in the program;
  associating, by the one or more processors, a compensation formula with each position in the performance driven floating compensation structure, wherein the compensation formula for at least one position in one level of the performance driven floating compensation structure is different than the compensation formula for at least one position in a second level of the performance driven floating compensation structure, and wherein a compensation formula for a position at a higher level yields a higher compensation amount than a compensation formula for a position at a lower level;
  accessing, by the one or more processors and for each of a plurality of customers in the multi-level marketing plan, a number of production points earned by the customer during a first production period, the production points being earned at least partially by one or more of the following:
    enrolling another customer into the multi-level marketing plan;
    enrolling another customer into an auto-purchase program; or
    attending a training event or activity;
  placing, by the one or more processors, each customer in the performance driven floating compensation structure based on the number of production points earned by the customer during the first production period such that customers having earned a higher number of production points in the first production period are placed at higher levels in the hierarchy than customers having earned a lower number of production points in the first production period;
  calculating, by the one or more processors and for each customer in the performance driven floating compensation structure, a compensation amount to be paid to the customer for performance during the first production period, the compensation amount being calculated based on:
    the compensation formula associated with the position in the performance driven floating compensation structure to which the customer was assigned based on the number of production points earned by the customer during the first production period; and
    an amount of sales generated by the customer during the first production period;
  accessing, by the one or more processors and for each of a plurality of customers, a number of production points earned by the customer during a second production period; and
  repositioning, by the one or more processors, each customer in the performance driven floating compensation structure based on the number of production points earned by the customer during the second production period such that customers having earned a higher number of production points in the second production period are placed at higher levels in the hierarchy than customers having earned a lower number of production points in the second production period, and such that customers receive a compensation amount for sales generated during the second production period based on the compensation formula of the position in the performance driven floating compensation structure to which the customers were repositioned.

11. The one or more non-transitory computer readable media of claim 10, wherein the multi-level marketing plan is selected from the group consisting of:
  vii. a uni-level plan;
  viii. a breakaway plan;
  ix. a matrix plan;
  x. a binary plan;
  xi. a stairstep plan; and
  xii. a hybrid plan.

12. The one or more non-transitory computer readable media of claim 11, wherein the multi-level marketing plan is a single leg matrix structure.

13. The one or more non-transitory computer readable media of claim 10, wherein the production period is one month.

14. The one or more non-transitory computer readable media of claim 10, wherein the production points are earned at least partially by one or more of the following:
   i. enrolling in the multi-level marketing plan;
   ii. a number of consecutive production periods that a customer is enrolled in the multi-level marketing plan;
   iii. a number of generations of enrolled customers below the customer in the multi-level marketing plan;
   iv. meeting group sales volume goals; or
   v. completing a segment of a training program.

15. The one or more non-transitory computer readable media of claim 10, wherein, when two or more customers have the same number of production points, a customer having enrolled in the multi-level marketing plan most recently is placed in the performance driven floating compensation structure prior to another customer having the same number of production points.

16. The one or more non-transitory computer readable media of claim 10, further comprising:
   calculating a matching bonus amount for a first customer in the multi-level marketing plan from wholesale price sales volume;
   determining if the first customer qualifies for the matching bonus;
   awarding the matching bonus to the first customer when the first customer qualifies for the matching bonus; and
   when the first customer does not qualify for the matching bonus, awarding the matching bonus to another customer that is positioned in the multi-level marketing plan, the other customer being the first qualified customer in the upline of the first customer.

17. The one or more non-transitory computer readable media of claim 16, wherein the first customer qualifies for the matching bonus if the first customer has a specified amount of personally enrolled active customers in a personal genealogy in the multi-level marketing plan.

18. The one or more non-transitory computer readable media of claim 16, wherein the first customer qualifies for the matching bonus based on the first customer's position in the performance driven floating compensation structure.

\* \* \* \* \*